US008365144B1

(12) United States Patent
Webb

(10) Patent No.: US 8,365,144 B1
(45) Date of Patent: Jan. 29, 2013

(54) PROXY GRAPHICAL USER INTERFACE GENERATION

(75) Inventor: Peter Hartwell Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1266 days.

(21) Appl. No.: 12/138,127

(22) Filed: Jun. 12, 2008

Related U.S. Application Data

(60) Provisional application No. 61/067,522, filed on Feb. 28, 2008.

(51) Int. Cl.
G06F 9/44 (2006.01)

(52) U.S. Cl. ........ 717/109; 717/113; 717/115; 717/125; 717/172; 715/734; 715/827; 709/224; 709/227; 709/229

(58) Field of Classification Search .......... 717/109–172; 709/222–230
See application file for complete search history.

(56) References Cited

U.S. PATENT DOCUMENTS

| | | | | |
|---|---|---|---|---|
| 5,347,627 | A * | 9/1994 | Hoffmann et al. | 715/762 |
| 5,638,504 | A * | 6/1997 | Scott et al. | 715/202 |
| 5,642,511 | A * | 6/1997 | Chow et al. | 717/105 |
| 2004/0001092 | A1* | 1/2004 | Rothwein et al. | 345/763 |
| 2005/0149914 | A1* | 7/2005 | Krapf et al. | 717/136 |

OTHER PUBLICATIONS

Mitrovic, N.; Royo, J.A.; Mena, E.; "ADUS: indirect generation of user interfaces on wireless devices," Database and Expert Systems Applications, 2004. Proceedings. 15th International Workshop on , pp. 662-666, Aug. 30-Sep. 3, 2004.*

Kaed, C.E.; Denneulin, Y.; Ottogalli, F.; "On the Fly Proxy Generation for Home Devices Interoperability," Mobile Data Management (MDM), 2011 12th IEEE International Conference on , vol. 1, pp. 299-302, Jun. 6-9, 2011.*

* cited by examiner

Primary Examiner — Wei Zhen
Assistant Examiner — Satish Rampuria
(74) Attorney, Agent, or Firm — Nelson Mullins Riley & Scarborough LLP

(57) ABSTRACT

An exemplary embodiment may provide tools for creating a graphical user interface (GUI) in a first or original environment and for embedding the GUI in a second or target environment. The GUI created in the first environment may be translated into a platform independent description. A proxy GUI may be generated from the platform independent description and incorporated in the second environment.

18 Claims, 16 Drawing Sheets

PROXY GRAPHICAL USER INTERFACE GENERATION

RELATED APPLICATION

The present application claims the benefit of U.S. Provisional Patent Application No. 61/067,522 filed on Feb. 28, 2008, the content of which is incorporated by reference in its entirety.

BACKGROUND INFORMATION

Graphical user interfaces (GUIs) may be provided in software applications. A user may interact with a GUI via an input device, such as a mouse or a keyboard. The ability to create GUIs may be provided in software development environments. The GUI may be defined by source code that controls where elements of the GUI appear and how the elements react to user initiated events. The GUIs may be created by translating the source code into a machine-readable format and executing the resulting machine readable code. In conventional software development environments, GUI code written for one environment, such as the Java environment, will not run in another environment, such as the Visual Basic environment, even if both environments are hosted on the same operating system.

SUMMARY

According to an embodiment, a computer-readable storage medium is provided for storing instructions that are executed in a computing device. The medium stores one or more instructions for creating a GUI for use in an original environment, and one or more instructions for analyzing the GUI to produce a platform independent description of the GUI. The medium also stores one or more instructions for generating a proxy GUI from the platform independent description of the user interface, and one or more instructions for integrating the proxy GUI in a target environment.

According to an embodiment, a computer-readable storage medium is provided for storing instructions that are executed in a computing device. The medium stores one or more instructions for generating a description of a graphical user interface, for example, a markup language representation of the graphical user interface created for use in a first environment. The medium also stores one or more instructions for applying a transformation to the markup language representation of the graphical user interface to generate a proxy graphical user interface. The medium further stores one or more instructions for deploying the proxy GUI to a second environment that differs from the first environment.

According to an embodiment, a system is provided for generating a GUI. The system may include a display device for displaying a GUI in a first environment. The system may also include a processor configured to analyze the GUI to produce a platform independent description of the GUI. The processor may generate a proxy GUI from the platform independent description of the GUI. The processor may also be adapted to deploy the proxy GUI to a second environment so that the proxy GUI is integrated in the second environment.

According to an embodiment, a computer-readable storage medium is provided for storing instructions that are executed in a computing device. The medium stores one or more instructions for creating an original graphical user interface for use in a first software environment, and one or more instructions for exporting the original graphical user interface into a platform independent form. The medium also stores one or more instructions for importing the platform independent form of the original graphical user interface into a second software environment that differs from the first software environment, and one or more instructions for creating a proxy graphical user interface in the second software environment that corresponds to the original graphical user interface.

According to an embodiment, a computer-readable storage medium is provided for storing instructions that are executed in a computing device. The medium stores one or more instructions for creating a schema object of graphical user interfaces native to a first environment, and one or more instructions for creating a parser from the schema object for parsing a graphical user interface to identify elements in the graphical user interface. The medium also stores one or more instructions for creating a platform independent schema object of graphical user interfaces, and one or more instructions for creating a platform independent description from the platform dependent graphical user interface native to the first environment according to the format specified by the platform independent schema object. With these instructions, the elements of a graphical user interface, which is native to a first environment, may be described in platform independent form.

According to an embodiment, a computer-readable storage medium is provided for storing instructions that are executed in a computing device. The medium stores one or more instructions for receiving a user event through a proxy graphical user interface in a target environment, and one or more instructions for, in response to the user event, executing a callback function in an original environment and changing an original graphical user interface. The medium also stores one or more instructions for the proxy graphical user interface to monitor changes in the original graphical user interface, and one or more instructions for updating the proxy GUI user interface to reflect changes in the original graphical user interface.

BRIEF DESCRIPTION OF THE DRAWINGS

The invention will be apparent from the description herein and the accompanying drawings, in which like reference characters refer to the same parts throughout the different views.

DETAILED DESCRIPTION

Figure 1A:
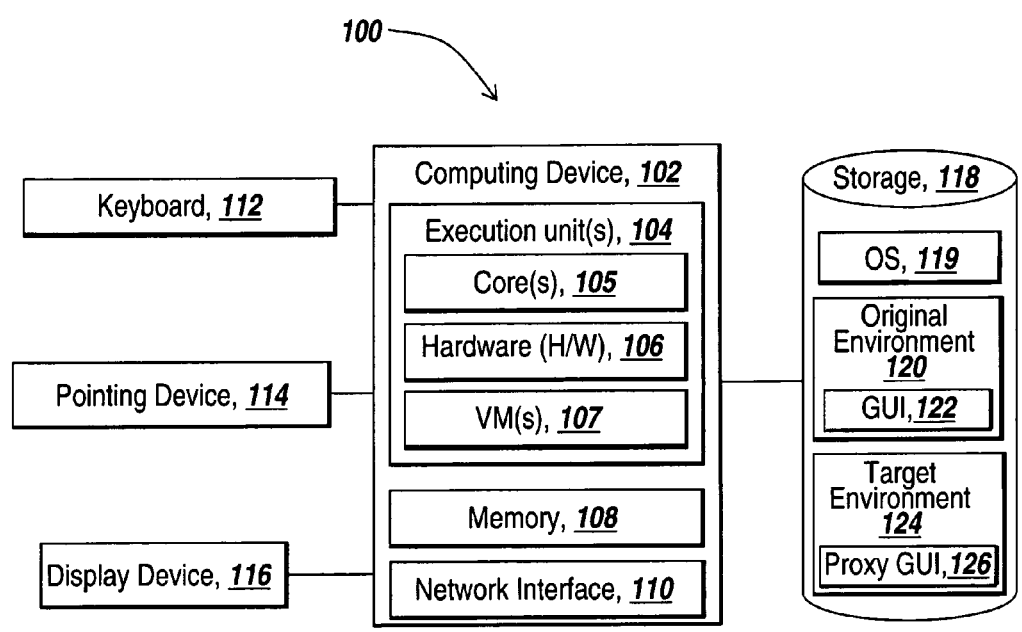
FIG. 1A depicts an exemplary computing device suitable for practicing exemplary embodiments.

Exemplary embodiments may provide a computer-implemented software tool that enables a user to embed a GUI native to one environment into another environment. For example, an exemplary embodiment may create a GUI in a development environment and run the GUI in an original environment. The development environment and the original environment may be the same environment. For example, a user may create and run a GUI in the MATLAB environment. In another exemplary embodiment, the development environment and the original environment may be different environments.

An exemplary embodiment may transform the GUI and embed the transformed GUI in a target environment that differs from the original environment. The transformed GUI may run in the target environment. In the exemplary embodiment, the original environment and the target environment may be user environments, such as Microsoft Windows, the X Window system or a web browser, although the original environment and the target environment may be development environments, such as the MATLAB environment, that can also be user environments. The user environment in the exemplary embodiment may host the same GUI on multiple platforms.

More generally, the original and target environment are environments in which a GUI developed for use in the original environment via currently available techniques is not compatible with the target environment. Exemplary embodiments resolve this incompatibility issue by allowing a GUI developed for use in the original environment to be used in one or more target environments.

The original GUI native to the original environment may be described by a description. The format of a GUI description may be defined by a GUI schema that describes a related collection or class of GUIs. A schema is a class definition that defines valid members of a class. A GUI schema describes the format of the data files that describe a single GUI. A GUI description is a class instance that is a member of the set defined by the schema, and describes a particular GUI. For example, a single schema may describe MATLAB GUIs or Microsoft Windows GUIs.

The exemplary embodiment creates a target GUI by using the original environment's schema to read the description of the GUI developed for the original environment and producing a target environment description file that conforms to the target environment schema. The exemplary embodiment translates the original GUI to the target GUI based on the original and target schemas for the original and target environments.

In an example, the target environment may also be defined with a schema. This schema may describe available GUI elements or controls in the target environment and/or may describe rules for event management. A proxy GUI description may be generated from the original GUI description by interpreting the original GUI description into the proxy GUI description based on the target environment schema. A proxy GUI may be generated from the proxy GUI description and integrated into the target environment. The proxy GUI may be functionally equivalent to the original GUI.

These proxy GUIs may enhance the portability of software components by enabling a user to develop a GUI in one environment and then access the developed GUI from another environment. This enhances the usability of software components by enabling users working in different environments to share a GUI developed in a particular environment. The proxy GUIs may also increase productivity. A GUI can be developed once, run in multiple places. Changes can be made once in the original environment, and then propagated to the target environments automatically.

Embedding a GUI native to one environment into another environment may facilitate code factoring and reuse. The embedding of a GUI may also enhance componentizing software.

In an exemplary embodiment, the GUI created in the original environment may be translated into a platform independent description. The platform independent description may conform to a platform independent GUI schema and may contain constraints on the structure and content of the GUI as described by the GUI schema. For example, the platform independent description may contain control layout data and information on how to invoke callbacks when a control is activated.

The platform independent description can be used to generate a proxy GUI that is incorporated into the target environment. The platform independent description may be transformed to a proxy GUI description based on the target environment schema. When a GUI element in the platform independent description is not available in the target environment, an equivalent element may be determined and substituted for the element.

In some exemplary embodiments, a user may interact with a GUI element in the proxy GUI to input a user event to the proxy GUI. For example, the user event may include clicking a button in the proxy GUI. When the proxy GUI receives a user event, a proxy callback function in the target environment is invoked. The proxy callback function invokes an original callback function in the original environment. The original callback function calls application code in the original environment to decide how to respond to the user event. The application code reacts to the user event as if the user event occurred relative to the original GUI. The application code may modify the original GUI as a result of responding to the user event. For example, a GUI element may become grayed out. The proxy GUI monitors the original GUI and any changes in the original GUI are transmitted to the proxy GUI. For example, when a GUI element in the original GUI becomes grayed out, a corresponding GUI element in the proxy GUI may also become grayed out. As such, the proxy GUI minors the original GUI.

FIG. 1A depicts exemplary computing system 100 that is suitable for practicing exemplary embodiments. Computing system 100 includes computing device 102. Computing device 102 may include execution unit(s) 104, memory 108 and network interface 110.

Computing device 102 may be any computer, such as a workstation, desktop computer, server, laptop, handheld computer or other form of computing or telecommunications device that is capable of communication and that has sufficient processor power and memory capacity to perform the operations described herein.

Execution unit(s) 104 may include hardware or software based logic to execute one or more instructions on behalf of computing device 102. For example, in one implementation execution unit(s) 104 may include one or more processors, such as a microprocessor. In one implementation, execution unit(s) 104 may include single or multiple cores 105 for executing software programs, instructions or code stored in memory 108, or other programs, instructions or code for controlling computing device 102.

In another implementation, execution unit(s) 104 may include hardware 106, such as a digital signal processor (DSP), a graphics processing unit (GPU), a field programmable gate array (FPGA), an application specific integrated circuit (ASIC), etc., on which at least a part of applications can be executed. In another implementation, execution unit(s) 104 may include virtual machine (VM) 107 for executing the one or more instructions loaded in the memory 108. Multiple VMs 107 may be resident on a single execution unit(s) 104. In an exemplary embodiment, computing device 102 may include a plurality of execution units 104.

Computing system 100 may include computer-readable mediums, such as memory 108 and storage 118, that hold computer-executable one or more instructions. Memory 108 may include a computer system memory or random access memory (RAM), such as dynamic RAM (DRAM), static RAM (SRAM), extended data out RAM (EDO RAM), etc. Memory 108 may include other types of memory as well, or combinations thereof.

Network interface 110 may interface to a communication network, such as a Local Area Network (LAN), Wide Area Network (WAN) or the Internet. The communication network will be described below in more detail with referenced to FIG. 13.

Network interface 110 may include a built-in network adapter, network interface card, personal computer memory card international association (PCMCIA) network card, card bus network adapter, wireless network adapter, universal serial bus (USB) network adapter, modem or any other device suitable for interfacing computing device 102 to any type of network capable of communication and performing the operations described herein.

Computing system 100 may also include keyboard 112, pointing device 114, display device 116 and storage 118. Display device 116 may display a proxy GUI and other user interface elements. A user may input a user event to the proxy GUI using keyboard 112 and/or pointing device 114.

Storage device 118 may be, for example, a hard-drive or CD-ROM, for storing operating system (OS) 119 and for storing application software programs, instructions or code, such as original environment 120 and target environment 124. Original environment 120 and target environment 124 may run on an operating system such as versions of the Microsoft® Windows operating systems, the different releases of the Unix and Linux operating systems, a version of the MacOS® operating system for Macintosh computers, an embedded operating system, a real-time operating system, an open source operating system, a proprietary operating system, an operating systems for mobile computing devices, or another operating system capable of running on the computing device and performing the operations described herein. Furthermore, operating system 119, original environment 120 and target environment 124 can be run from a bootable compact disk (CD), such as, for example, KNOPPIX®, a bootable CD for GNU/Linux.

Although original environment 120 and target environment 124 are depicted to run on the same computing device, and on the same operating system, original environment 120 and target environment 124 may run on different computing devices, and/or on different operating systems.

Original environment 120 may enable a user to create GUI 122. GUI 122 is a graphical user interface which allows a user to interact with computing system 100 in original environment 120. GUI 122 may include the graphical elements, such as graphical icons, pull-down menus, buttons, selection boxes, progress indicators, on-off checkmarks, scroll bars, windows, window edges, toggle buttons, forms, etc. The graphical elements may be used in conjunction with text to display information or to respond to user actions.

In original environment 120, the user may generate one or more instructions for GUI 122, such as source code and a description (which conforms to a schema), and execute the code to display GUI 122 on display device 116. A user may generate a proxy GUI 126 from GUI 122 and embed proxy GUI 126 in the target environment 124. Proxy GUI 126 may include graphical elements corresponding to the graphical elements of original GUI 122. Proxy GUI 126 is functionally equivalent to original GUI 122 and allows a user to interact with computing system 100 in target environment 124.

Original environment 120 and/or target environment 124 may include a text-based environment and/or graphical environment and embodiments can be implemented in the text-based environment and/or the graphical environment. Additionally, original environment 120 and/or target environment 124 may be hybrid environments, incorporating both graphical and text-based forms of input and output. Original environment 120 and/or target environment 124 may include a technical computing environment (TCE) and embodiments can be implemented in the TCE. A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language such as C++, C, Fortran, Pascal, etc.

In one implementation, a technical computing environment (TCE) may include a dynamically typed language that can be used to express problems and/or solutions in mathematical notations familiar to those of skill in the relevant arts. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and design, state based analysis and design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, distributed processing, etc.). In another implementation, a TCE may provide these functions as block sets. In still another implementation, a TCE may provide these functions in another way, such as via a library, etc., a TCE may be implemented as a text based environment, a graphically based environment, or another type of environment, such as a hybrid environment that is both text and graphically based.

Figure 1B:
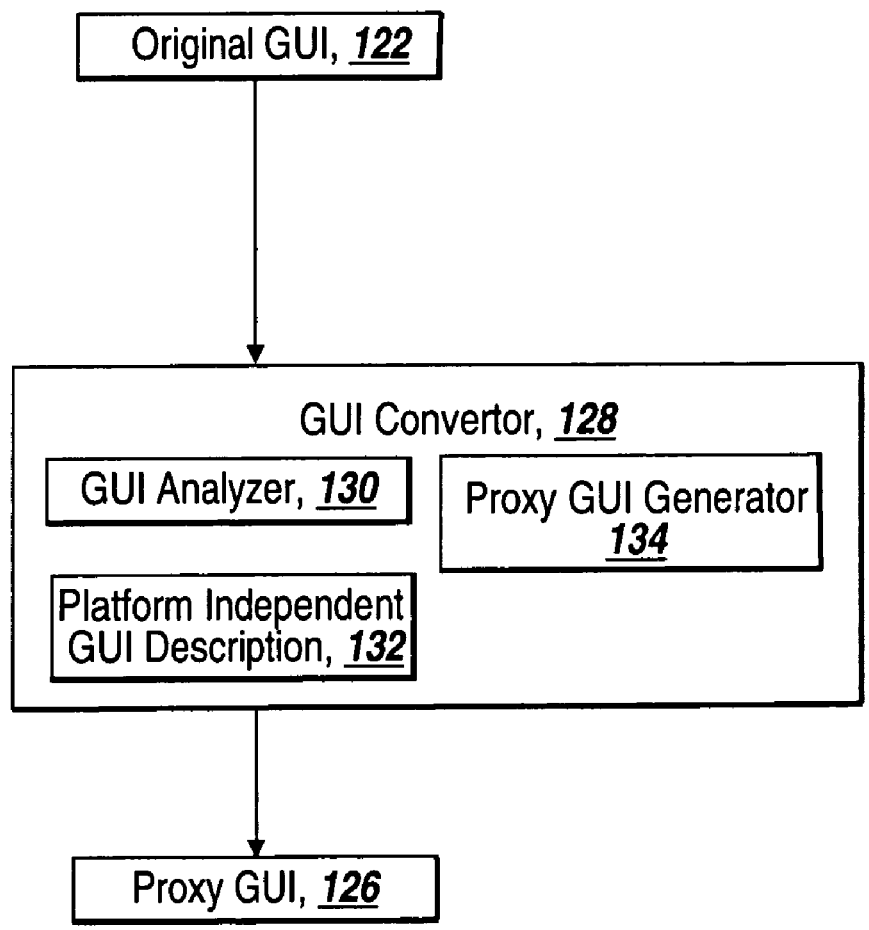
FIG. 1B depicts exemplary tool for generating a proxy GUI.

FIG. 1B depicts components that may be used in exemplary embodiments for generating a proxy GUI. GUI converter 128 may be provided in original environment 120 to convert original GUI 122 into proxy GUI 126. In another exemplary embodiment, GUI converter 128 may be provided in different environments, such as target environment 124. GUI Converter 128 may run in an environment different from either the original or the target environment. The conversion may include a GUI analysis phase and a proxy GUI generation phase. GUI converter 128 may include GUI analyzer 130 for performing the GUI analysis phase and proxy GUI generator 134 for performing proxy GUI generation phase. GUI analyzer 130 may analyze original GUI 122 to determine the elements of original GUI 122 and to extract information about the elements of original GUI 122. GUI analyzer 130 may generate platform independent description 132 of original GUI 122 using the determined elements and extracted information regarding original GUI 122. GUI analyzer 130 will be described below in more detail with reference to FIGS. 4 and 5. Proxy GUI generator 134 may generate proxy GUI 126 from platform independent description 132 of original GUI 122. Proxy GUI generator 134 will be described below in more detail with reference to FIGS. 4 and 10.

Figure 2A:
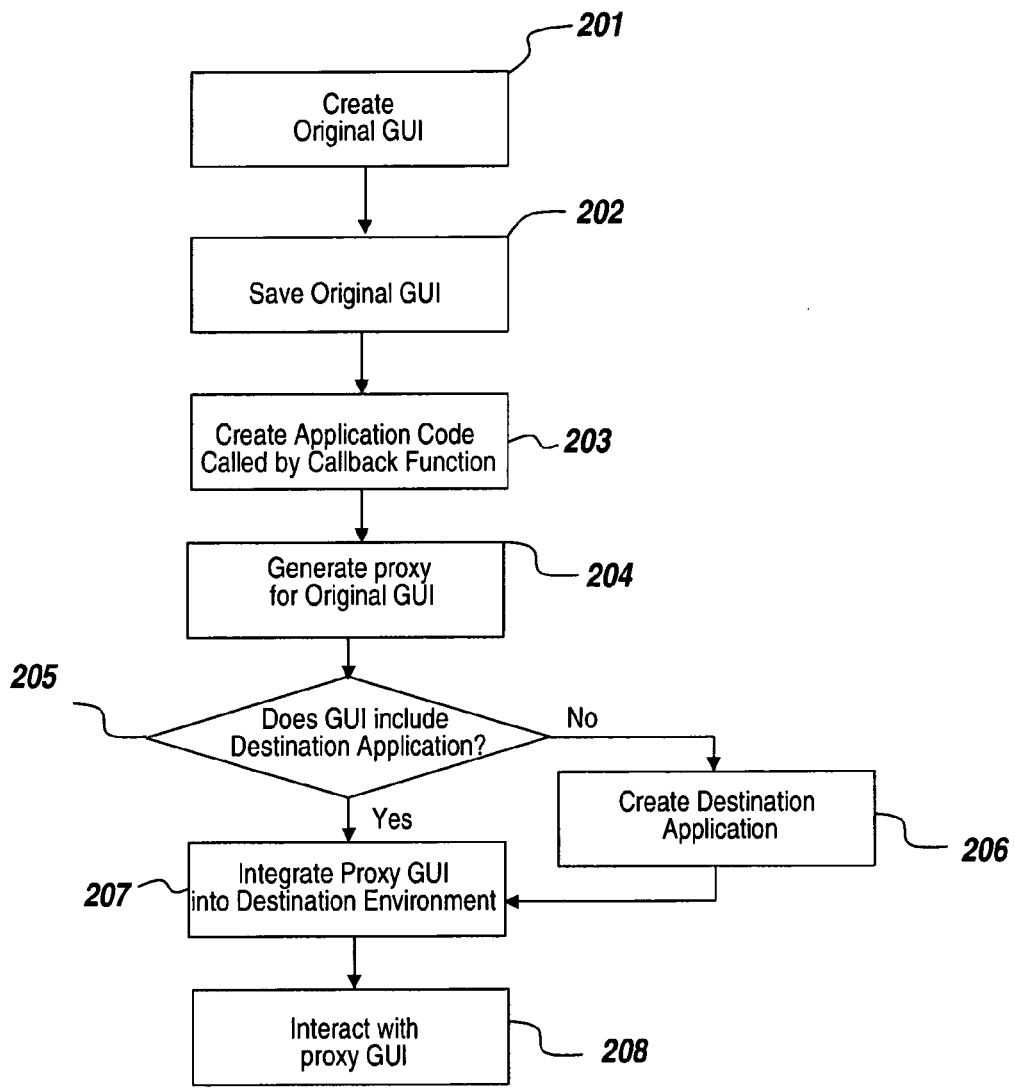
FIG. 2A depicts a flowchart that shows an exemplary procedure for generating a proxy GUI in one environment and embedding the GUI in another environment.

FIG. 2A depicts an exemplary flowchart that shows the creation of original GUI 122 in original environment 120 and the embedding of proxy GUI 126 in target environment 124. A user may create original GUI 122 in original environment 120 (201) and save original GUI 122 to a file (202). In an exemplary embodiment, original GUI 122 may be created in the MATLAB environment and saved in a MAT-file. Original GUI 122 may be saved in any file format that allows the storage of a GUI description.

A user may also generate at least one callback function in original environment 120. The callback function may refer to a function that defines an action performed in response to a user event in original GUI 122. The user event may include, for example, pushing a button in original GUI 122, inputting text data to original GUI 122, etc. The callback function may be invoked from original GUI 122.

A user may also create application code called by the callback function (203). The application code may be called by original callback function to respond to user events relative to original GUI 122. For example, when a user clicks on a button in original GUI 122, the callback function calls the application code to respond.

Proxy GUI 126 may be generated from original GUI 122 using GUI converter 128 (204). For example, an Excel proxy GUI for a MATLAB GUI may be generated using GUI converter 128. If original GUI 122 is part of a standalone application in original environment 120, GUI converter 120 may, in conjunction with other tools, produce a standalone application in target environment 124. The generation of proxy GUI 126 will be described in more detail with reference to FIGS. 2B-2E.

If GUI 122 is part of a standalone application (205), proxy GUI 126 may be integrated into the target destination environment (207). In this case, step 207 may be performed automatically as a part of step 204. If GUI 122 and a destination application are different, a destination application may be created (206) and proxy GUI 126 is integrated into target destination environment (207). A user may interact with the proxy GUI in the destination application in the target environment (208).

This embodiment is illustrative and similar embodiments may exist for many different GUI target environments. For example, this procedure may apply to a Java target environment, an X Windows target environment, an Apple Macintosh native GUI, Web browsers and any target environment that supports interactive GUIs. The target environment may support a "canvas" or drawing area, and user interface controls, such as buttons, text input fields, menus, etc.

Figure 2B:
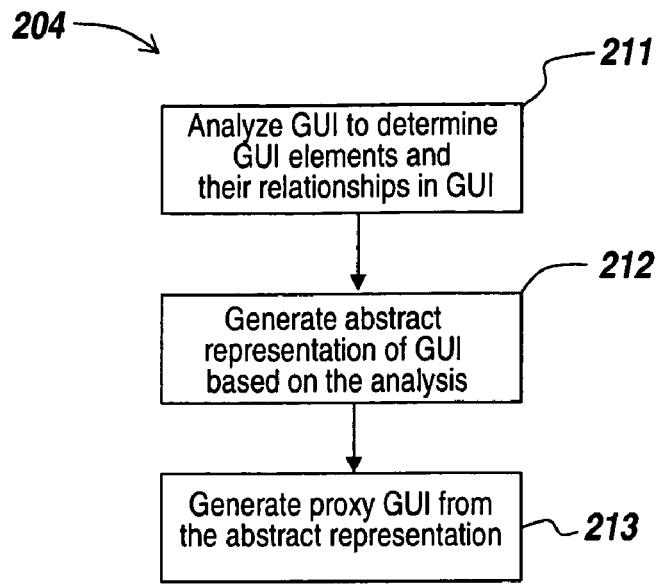
FIG. 2B depicts a flowchart that shows an exemplary procedure for generating a proxy GUI.

FIG. 2B depicts an exemplary flowchart that shows the generating of a proxy GUI in more detail. To generate proxy GUI 126 from original GUI 122, original GUI 122 may be analyzed to determine the GUI elements in original GUI 122 and the relationships among the GUI elements in original GUI 122 (211). The analysis of original GUI 126 will be described in more detail with reference to FIGS. 2C-2E. Based on the analysis of original GUI 122, an abstract representation of original GUI 122 may be created (212). The abstract representation of original GUI 122 may include a list of the GUI elements in original GUI 122. The abstract representation of original GUI 122 may also include the abstract layout of original GUI 122. The abstract layout of original GUI 122 describes the relationships among the GUI elements in original GUI 122. The abstract representation may be described using platform-independent language, such as the eXtensible Markup Language (XML). From the abstract layout of the original GUI, a concrete instantiation of a proxy GUI may be generated for any type of target or destination environment (213). For example, a JSP implementation of the proxy GUI may be generated from the abstract representation of an original GUI. A transformation or process may be used to generate the proxy GUI from the abstract representation of the original GUI. An exemplary transformation may include eXtensible Stylesheet Language Transformation (XSLT) for transforming XML documents into other XML documents.

Figure 2D:
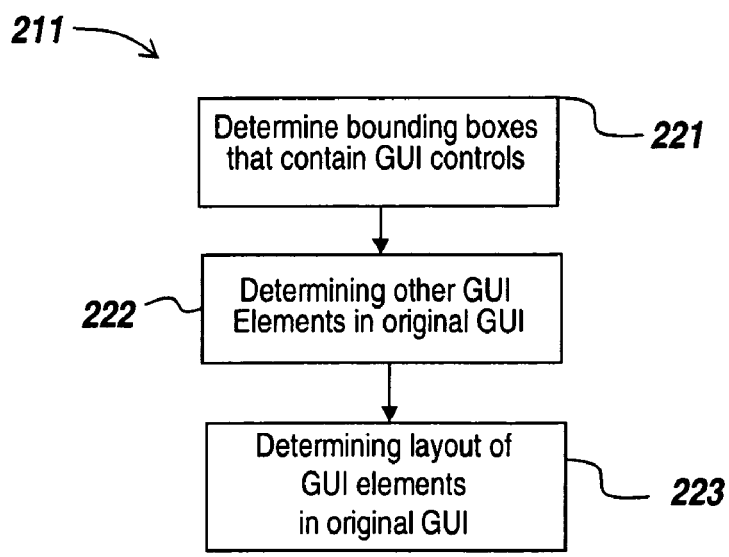
FIG. 2D depicts a flowchart that shows an exemplary procedure for analyzing an original GUI.
Figure 2C:
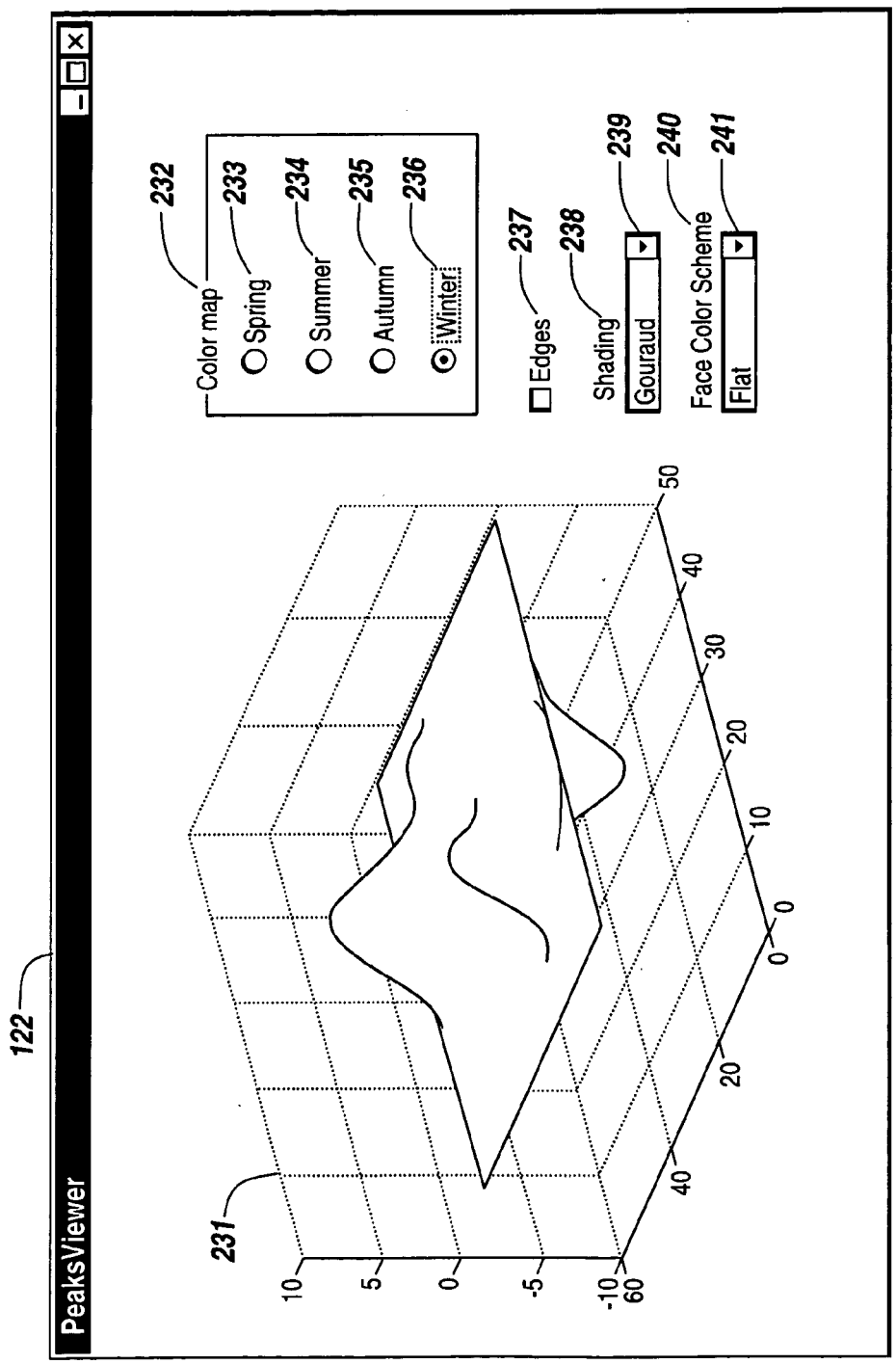
FIG. 2C depicts an exemplary GUI.

FIG. 2C depicts an example of an original GUI. Original GUI 122 may include 3-D axes 231, Color map box 232, Edges checkbox 237, Shading text 237 and menu 239 and Face Color Scheme text 240 and menu 241. Color map 232 may contain checkboxes 233-236. Original GUI 122 may include a single row and two columns on the top level. 3-D axes 231 is located in the left column of the original GUI 122. Color map box 232, Edges checkbox 237, Shading text 237 and menu 239 and Face Color Scheme text 240 and menu 241 are located in the right column of the original GUI 122. Within the second column, Color map box 232, Edges checkbox 237, Shading text 237 and menu 239 and Face Color Scheme text 240 and menu 241 are located in the separate rows.

FIG. 2D depicts an exemplary flowchart that shows the analysis procedure of an original GUI in more detail. The analysis seeks to determine the spatial relationships between GUI elements so those relationships can be maintained in the proxy GUI. Original GUI 122 may be analyzed to determine bounding boxes that contain GUI controls (221). For example, Color map 232 contains checkboxes 233-236. Original GUI 122 may also be analyzed to determine other GUI elements in original GUI (222). For example, original GUI 122 may include 3-D axes 231, Color map box 232, Edges checkbox 237, Shading text 237 and menu 239 and Face Color Scheme text 240 and menu 241. As discussed above, the GUI elements of original GUI 122 are included in the abstract representation of original GUI 122. The layout of original GUI 122 may also be determined to maintain the relationship among the GUI elements in a proxy GUI (223). The determination of the layout of original GUI 122 will be described in more detail with reference to FIG. 2E.

Figure 2E:
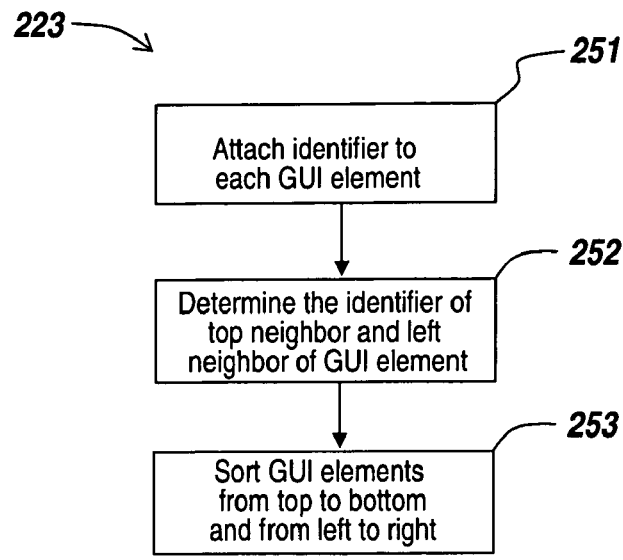
FIG. 2E depicts a flowchart that shows an exemplary procedure for determining the layout of an original GUI.

FIG. 2E depicts an exemplary flowchart that shows the determining of the layout of an original GUI in more detail. In an exemplary embodiment, each GUI control in original GUI 122 may be assigned an identifier, such as a numerical identifier (251). The layout may be determined by defining the neighbors of a GUI element in original GUI 122. For example, the layout of original GUI 122 may be described by the closest top neighbor and the closest left neighbor of each GUI element in original GUI 122. Each GUI element in original GUI 122 may be associated with the identifiers of the closest top neighbor and the closest left neighbor of the GUI element (252). The outside frame of original GUI 122 may also be assigned an identifier to describe which GUI elements are closest to the outside frame. The GUI elements are sorted from top to bottom and from left to right based on the determined relationship among the GUI elements (253).

The sorted list may be used to describe the layout of original GUI 122 in the abstract representation of original GUI 122 so that the relationship among the elements in original GUI 122 is maintained when the abstract representation is transformed into a particular proxy GUI. For example, 3-D axes 231 and other elements, such as Color map box 232, Edges checkbox 237, Shading text 237 and menu 239 and Face Color Scheme text 240 and menu 241, of original GUI 122 are described in the same row and different columns in the abstract representation. Color map box 232, Edges checkbox 237, Shading text 237 and menu 239 and Face Color Scheme text 240 and menu 241 are described in the same column and different rows. Within Color map box 232, checkboxes 233-236 are described in the same column and different rows.

An exemplary XML description of the layout of original GUI 122 is provided as follows.

```
<Layout>
  <Row>
    <Column>
      <Area>figure1</Area>
      <Layout>
        <Row>
          <Column>
            <Area>axes1</Area>
          </Column>
          <Column>
            <Area>Area0</Area>
            <Layout>
              <Row>
                <Column>
                  <Area>ColormapGroup</Area>
                  <Layout>
                    <Row>
                      <Column>
                        <Area>Area1</Area>
                        <Layout>
                          <Row>
                            <Column>
                              <Area>springradio</Area>
                            </Column>
                          </Row>
                          <Row>
                            <Column>
                              <Area>summerradio</Area>
                            </Column>
                          </Row>
                          <Row>
                            <Column>
                              <Area>autumnradio</Area>
                            </Column>
                          </Row>
                          <Row>
                            <Column>
                              <Area>winterradio</Area>
                            </Column>
                          </Row>
                        </Layout>
                      </Column>
                    </Row>
                  </Layout>
                </Column>
              </Row>
              <Row>
                <Column>
                  <Area>edgecheck</Area>
                </Column>
              </Row>
              <Row>
                <Column>
                  <Area>text1</Area>
```

-continued

```
                </Column>
              </Row>
              <Row>
                <Column>
                  <Area>ShadingMenu</Area>
                </Column>
              </Row>
              <Row>
                <Column>
                  <Area>text2</Area>
                </Column>
              </Row>
              <Row>
                <Column>
                  <Area>FaceColorMenu</Area>
                </Column>
              </Row>
            </Layout>
          </Column>
        </Row>
      </Layout>
    </Column>
  </Row>
</Layout>
```

As shown above, the layout of original GUI 122 may be described using rows and columns of areas where the GUI elements are located in original GUI 122. For example, the closest left neighbor of a GUI element may be placed in the same row as the GUI element. The closest top neighbor of a GUI element may be placed in the same column as the GUI element. From the XML description, a proxy GUI may be generated using, for example, the <div> tag in Hyper-Text Markup Language (HTML). The <div> tag defines a division/section in a document.

Figure 3:
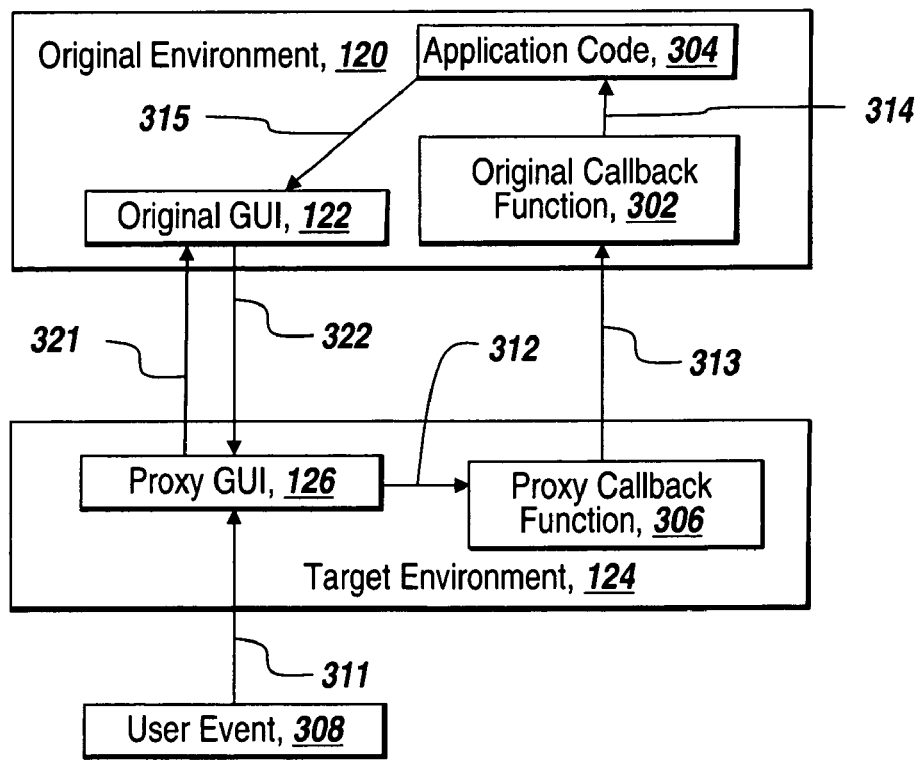
FIG. 3 depicts an exemplary event management cycle.

FIG. 3 depicts an exemplary event management cycle. The event management cycle may refer to a series of actions in the system 100 that show how a user interaction with a proxy GUI is processed. Original environment 120 may include original GUI 122, callback function 214 and application code 216. Target environment 124 may include proxy GUI 126 and proxy callback function 244.

A user may interact with proxy GUI 126 to input user event 308 to proxy GUI 126 (311). The user event may include, for example, pushing a button in proxy GUI 126, inputting text data to proxy GUI 126, etc. Proxy GUI 126 may invoke proxy callback function 306 (312), passing information about user event 308 to original callback function 302. This user event information may include information on the pressed button, the state of the mouse button, the state of keyboard, etc. Proxy callback function 306 may invoke original callback function 302 (313), passing the user event information to original callback function 302. Proxy callback function 306 may translate the user event information so that original callback function 302 can handle the information.

Original callback function 302 may behave as if it had been invoked from the original GUI 122. Original callback function 302 may invoke some application code 304 (314) to perform the processing associated with user event 308, such as saving a database, drawing an image, etc. The application code 304 may update the original GUI 122 (315), for example, by graying out buttons, placing an image in a drawing area, making a new part of the GUI visible, etc.

The proxy GUI 126 monitors the original GUI 122 for changes (321). Any changes in the original GUI 122 caused by the execution of the application code are transmitted to the proxy GUI 126 (322) so that the state of proxy GUI 126 mirrors the state of original GUI 122.

Figure 4:
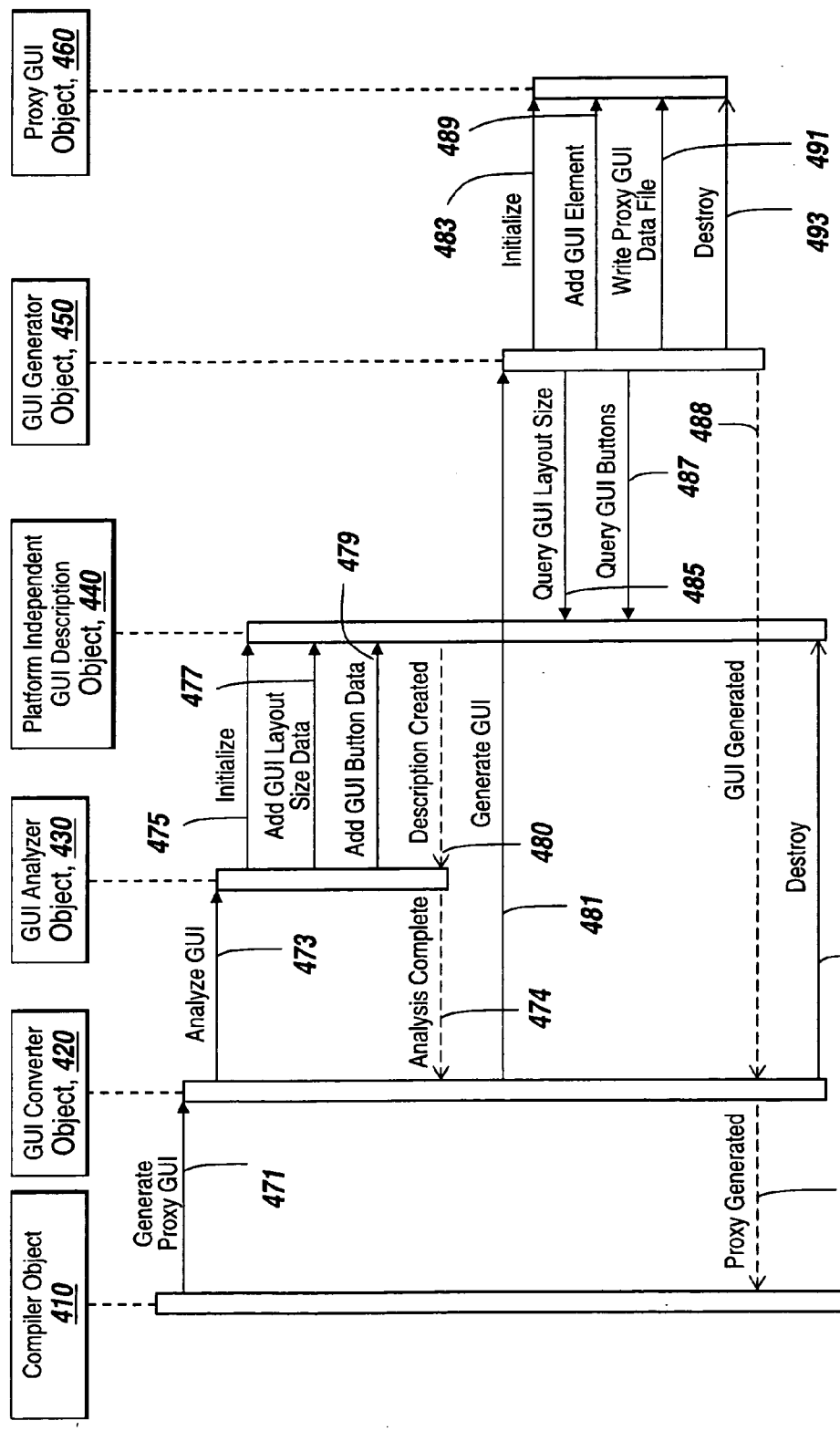
FIG. 4 depicts an overview of proxy GUI generation.

FIG. 4 depicts an exemplary sequence diagram that shows details for proxy GUI generation in an exemplary embodiment. This diagram is an industry standard UML sequence diagram with semantics defined, for example in Wikipedia: http://en.wikipedia.org/wiki/Sequence diagram or in print form in "The Elements of UML 2.0 Style," Cambridge University Press. The generation of a proxy GUI may be described relative to an object-oriented programming environment that uses "objects" and their interactions to design applications and computer programs. For example, original GUI 122, proxy GUI 126, GUI converter 128, GUI analyzer 130, platform independent description 132, proxy GUI generator 134, original callback function 302, proxy callback function 306 and other entities may be described as "objects" in the exemplary embodiment. The object lifetime from the creation of the object until the destruction of the object is indicated, in FIG. 4 by the wide vertical bars. Some of the "Destroy Object" messages have not been depicted in the figures. For example, the "Destroy Object" messages for GUI converter object 420 and GUI generator object 450 are not shown in the figures. In this example, GUI converter object 420 is coupled to compiler object 410, and the proxy GUI generation is driven by compiler object 410. In other embodiments, GUI converter object 420 is not driven by compiler object 410, and the proxy GUI generation is performed regardless of compiler object 410.

The GUI analysis phase and the proxy GUI generation phase may share a common data object, i.e. platform independent GUI description object 440.

In the GUI analysis phase, compiler object 410 may send a message to generate proxy GUI object 460 (arrow 471). GUI converter object 420 then may send a message to request the analysis of a GUI generated in an original environment (arrow 473). GUI analyzer object 430 may create and/or initialize platform independent GUI description object (arrow 475). GUI analyzer object 430 then may analyze the original GUI to determine a GUI layout and gather information regarding different types of GUI controls, such as buttons, menus, text entry fields, checkboxes, etc., in the original GUI. GUI analyzer object 430 may add the GUI layout data (arrow 477) and the GUI control or element data (arrow 479) to platform independent GUI description object 440. The GUI analysis phase is completed with the generation of platform independent GUI description object 440 (arrow 480) and GUI analyzer object 430 may send a message that the analysis is completed (arrow 474).

Additional detail regarding the GUI analysis phase will be described below in more detail with reference to FIG. 5.

In the proxy GUI generation phase, GUI converter object 420 may pass Platform Independent GUI description object 440 to GUI generator object 450 (arrow 481). Platform independent GUI description object 440 is valid when GUI converter object 420 invokes GUI generator object 450. GUI generator object 450 may then create and/or initialize proxy GUI object 460 (arrow 483). GUI generator object 450 may query platform independent GUI description object 440 to obtain information, such as the GUI layout size and information regarding GUI controls or elements (arrows 485 and 487). GUI generator object 450 then adds the GUI elements to proxy GUI object 460 (arrow 489). The proxy GUI data may be written to a file in target environment specific source code (arrow 491) and stored in storage. The proxy GUI data may also be written in a descriptive language, which is also a valid instance of a GUI schema in the target environment, rather than source code—for example, XML—before being stored in storage. Proxy GUI object 460 may be destroyed (arrow 493). GUI generator 450 may send GUI converter 420 a message that a proxy GUI is generated (arrow 488) and GUI converter object 420 may forward the message to compiler object 410 (arrow 472). Platform independent GUI description object 440 then may be destroyed (arrow 495). At this point the proxy GUI generation phase is complete.

The proxy GUI generation phase will be described below in more detail with reference to FIG. 10.

Figure 5:
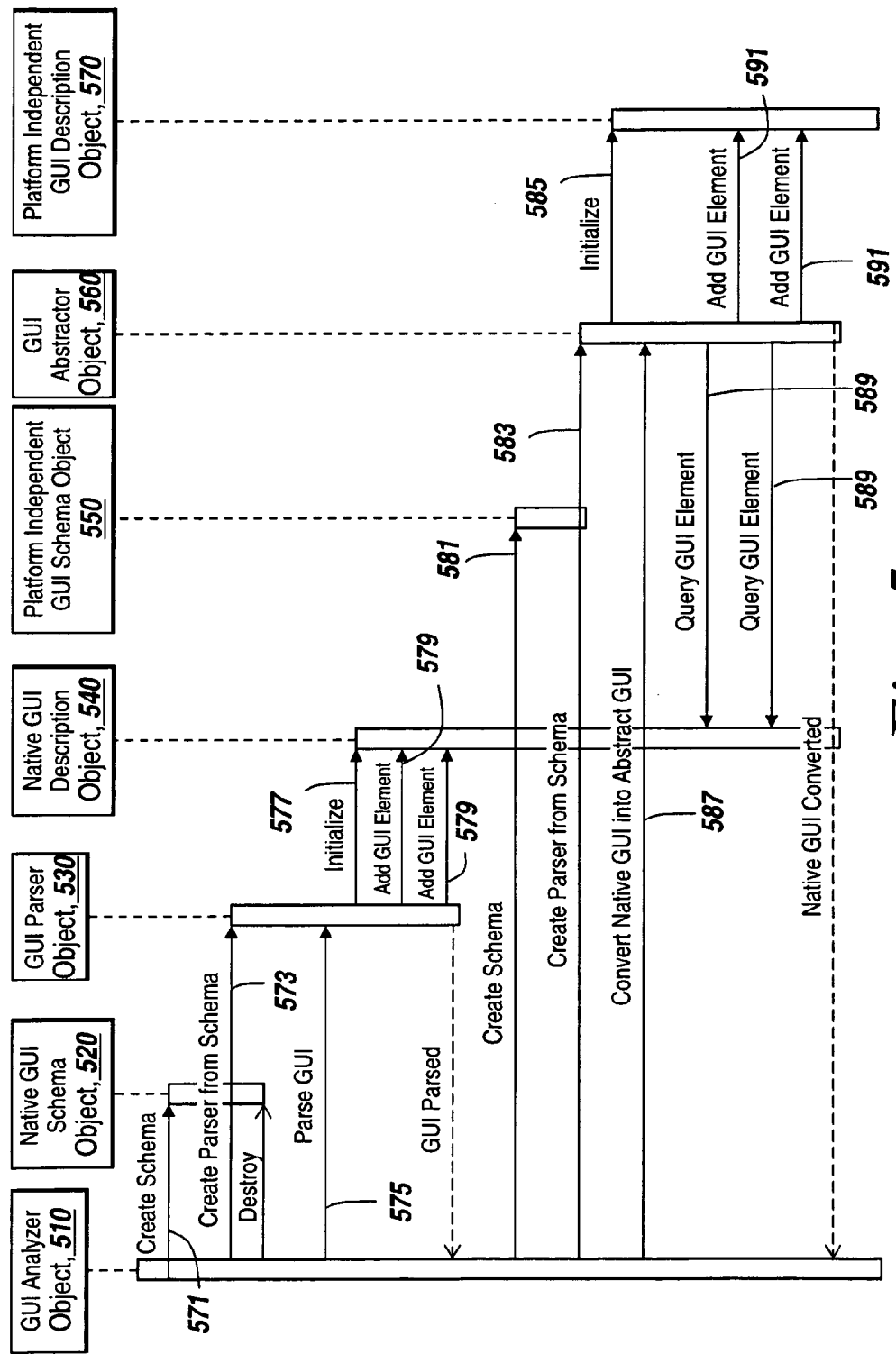
FIG. 5 depicts an exemplary GUI analysis procedure.

FIG. 5 depicts an exemplary sequence diagram that illustrates the GUI analysis phase in more detail. The GUI analysis phase may include creating native GUI description object 540. Native GUI schema object 520 may be created before native GUI description object 540. Native GUI description object 540 describes a GUI native to the original environment. The GUI analysis procedure may also include creating platform independent GUI description object 570 from native GUI description object 540.

In the GUI analysis phase, GUI analyzer object 510 may create native GUI schema object 520, i.e. a schema that describes a class of GUIs supported by the original environment (arrow 571). GUI analyzer object 510 may also create GUI parser object 530 from native GUI schema object 520 (arrow 573). GUI schema object 520 and GUI parser object 530 may be created from a native GUI schema class and a GUI parser class, respectively. Exemplary native GUI schema class and GUI parser class are described below with reference to FIGS. 6A and 6B. GUI parser object 530 parses the native GUI and determines the elements of the native GUI. When receiving a message to parse the GUI (arrow 575), GUI parser object 530 may native GUI description object 540 (arrow 577) that may provide a template for generally describing a GUI native to the original environment. Parser object 530 then adds the GUI elements to native GUI description object 540 (arrows 579) to complete native GUI description object 540.

GUI analyzer object 510 may create platform independent GUI schema object 550 (arrow 581). GUI analyzer 510 object may also create GUI abstractor object 560 from the platform independent GUI schema object 550 (arrow 583). GUI abstractor object 560 is an object that may determine and abstract the GUI elements described in the native GUI description object 530. The GUI abstractor object 560 may create and initialize platform independent GUI description object 570 (arrow 585). When receiving a message to convert a native GUI to an abstract GUI (arrow 587), the abstractor object 560 may query GUI elements in the native GUI description object 530 (arrows 589) and add the GUI elements to platform independent GUI description object 570 (arrows 591). The platform independent GUI description object 570 (also, 440 with reference to FIG. 4) is used as an input to the GUI generation phase described below in more detail with reference to FIG. 10.

Native GUI schema object 520 and platform independent GUI schema object 550 will be described below in more detail with reference to FIG. 6A. GUI parser object 530 and GUI abstractor object 560 will be described below in more detail with reference to FIG. 6B. Native GUI description object 540 and platform independent GUI description object 570 will be described below in more detail with reference to FIG. 7.

Figure 6A:
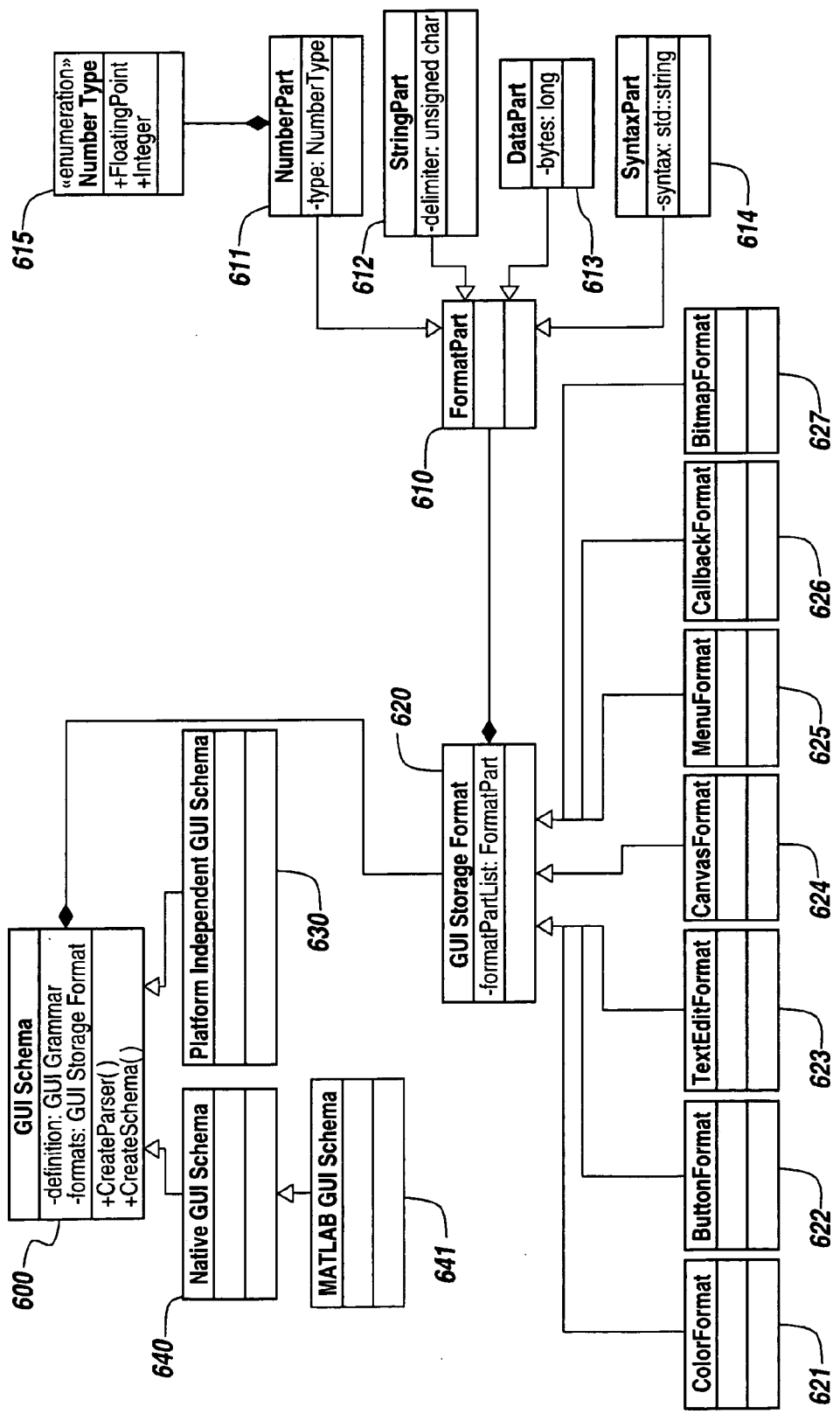
FIG. 6A shows an exemplary GUI schema hierarchy.

FIG. 6A shows an exemplary class diagram showing a GUI schema hierarchy that supports an exemplary GUI analysis. The GUI schema hierarchy includes GUI schema class 600 and its subclasses, such as platform independent GUI schema class 630, native schema class 640 and MATLAB schema class 641. The open arrowhead represents a relationship between a parent or super class and a child or subclass. With the relationship, the child may inherit the structure and behavior of the parent. Children may also specialize the behavior of their parents; this is called overloading, the mechanisms and utility of which is well-known to practitioners of the art of object-oriented computer programming. For example, Color Format 621 is a child of GUI storage format class 620 as indicated by the open arrowhead.

The GUI schema hierarchy may provide a mechanism to describe a GUI, combining a GUI grammar and a list of GUI storage formats. The GUI grammar may enumerate the parts of the GUI and describe how they fit together. The GUI grammar will be described below in more detail with reference to FIG. 8.

The filled diamond represents a "has-a" relationship between instances of classes. For example, an instance of schema class 600 has an instance of GUI storage format class 620. That is, the instance of GUI storage format class 620 is a part of the instance of schema class 600.

GUI storage format class 620 may describe how each element of a GUI is stored. GUI storage format class 620 may be the parent of subclasses for format information regarding various aspects of a GUI, such as ColorFormat 621, ButtonFormat 622, TextEditFormat 623, CanvasFormat 624, MenuFormat 625, CallbackfFormat 626, BitmapFormat 627, etc. For example, ColorFormat 621, which specifies color, may include three bytes one each for the red, green and blue components of the color.

The instance of GUI storage format class 620 may include the property of formatPartList having type FormatPart. This property may be defined by FormatPart class 610 having subclasses, such as NumberPart 611, StringPart 612, DataPart 613, SyntaxPart 614, NumberType 615. Each of these Part subclasses describes the storage format of the corresponding data type.

GUI schemas may be stored in storage 118 in XML format in an exemplary embodiment. In other embodiments, the schemas may be stored in any computer-readable form. The GUI schema class 600, via the CreateSchema( ) function, may read a schema description and apply its own environment specific storage format knowledge to create a complete description of the GUI schema. The complete description of the GUI schema may enable automatic construction of a parser (GUI reader).

Figure 6B:
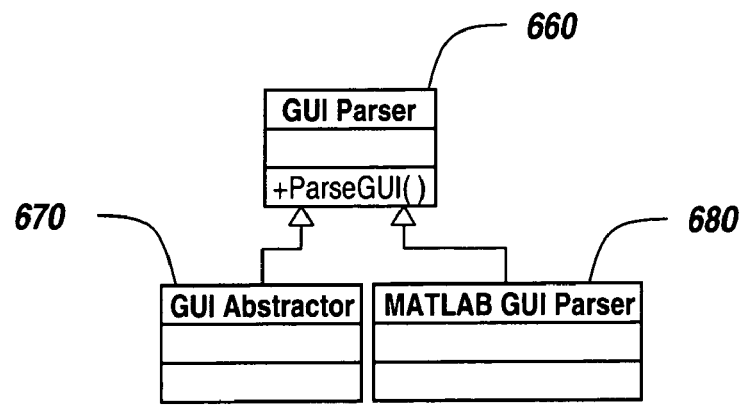
FIG. 6B shows an exemplary GUI parser hierarchy.

FIG. 6B shows an exemplary GUI parser hierarchy that supports an exemplary GUI analysis. GUI schema class 600, via the CreateParser( ) function, may create a parser from the schema of an environment. GUI parser class 660 may include an operation, such as ParseGUI( ) to parse a GUI and determine the elements of the GUI. The GUI parser hierarchy may include subclasses, such as, GUI abstractor 670 and MATLAB GUI parser 680. MATLAB GUI parser 680 may parse a GUI native to the MATLAB environment and generate a MATLAB native GUI description. GUI abstractor 670 may abstract the elements from the MATLAB native GUI description and use the elements to generate a platform independent GUI description.

Figure 7:
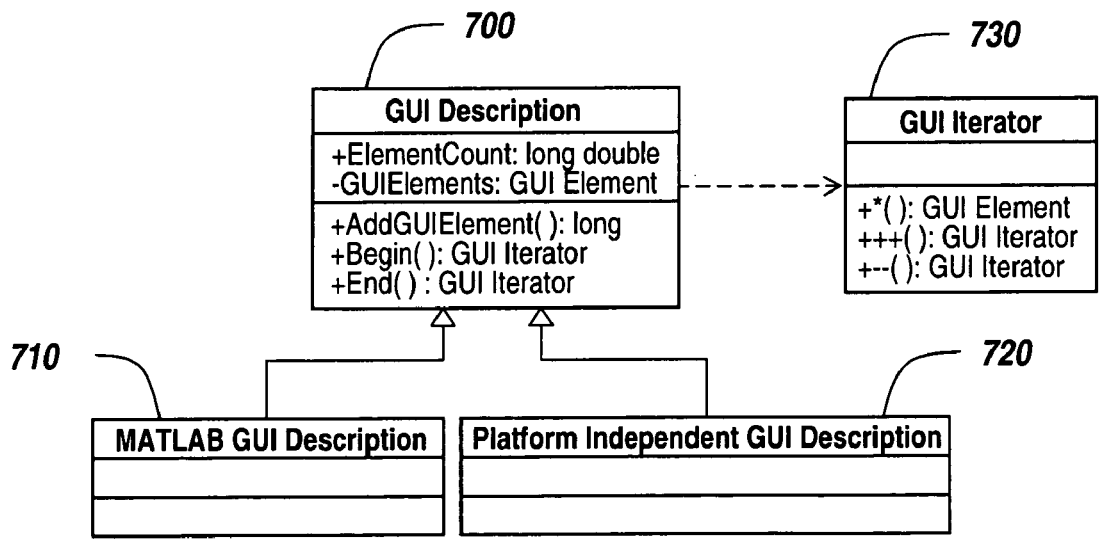
FIG. 7 shows an exemplary GUI description hierarchy.

FIG. 7 shows an exemplary GUI description hierarchy that may support an exemplary GUI analysis. The hierarchy may include a GUI description class 700 that represents an actual instance of a particular GUI while the GUI schema 600 delimits the set of many possible GUI descriptions. An exemplary embodiment may use GUI descriptions in two different ways. One is an environment-specific GUI description class, such as MATLAB GUI description 710, and the other is platform independent description class 720 from which the proxy GUI is generated. Instances of platform independent class 720 may be generated from instances of MATLAB GUI description 710 by GUI Abstractor 560 (see FIG. 5). In this case, an instance of platform independent class 720 may be equivalent to platform independent GUI description object 570 in FIG. 5 and an instance of MATLAB GUI description class 710 equivalent to Native GUI Description object 540 in FIG. 5.

GUI description class 700 may include properties, for example, an element count and a list of GUI elements, and operations, such as AddGUIElement( ), Begin( ) and End( ) The AddGUIElement( ) operation may add GUI elements to the GUI description. Begin( ) and End( ) operations may return a GUI iterator representing the beginning and the end of the GUI Element list, respectively. To facilitate access to the GUI description data, GUI iterator class 730 may enable hierarchical iteration over the elements of a GUI. Each instance of GUI iterator class 730 may visit the GUI elements of a given level. An instance of GUI iterator class 730 may access the GUI elements in the same level of hierarchy. For example, if the GUI includes a frame surrounding three radio buttons and an OK and Cancel buttons outside the frame, the first GUI iterator may access the frame and OK and Cancel buttons. A GUI iterator obtained from the Frame may then allow access to the three radio buttons inside the frame. This hierarchical access may allow GUIs to be traversed at multiple levels. A top-level view may be used to determine how to lay out the overall GUI, and a detailed view may be used for wiring the proxy GUI to the native callback functions.

Figure 8:
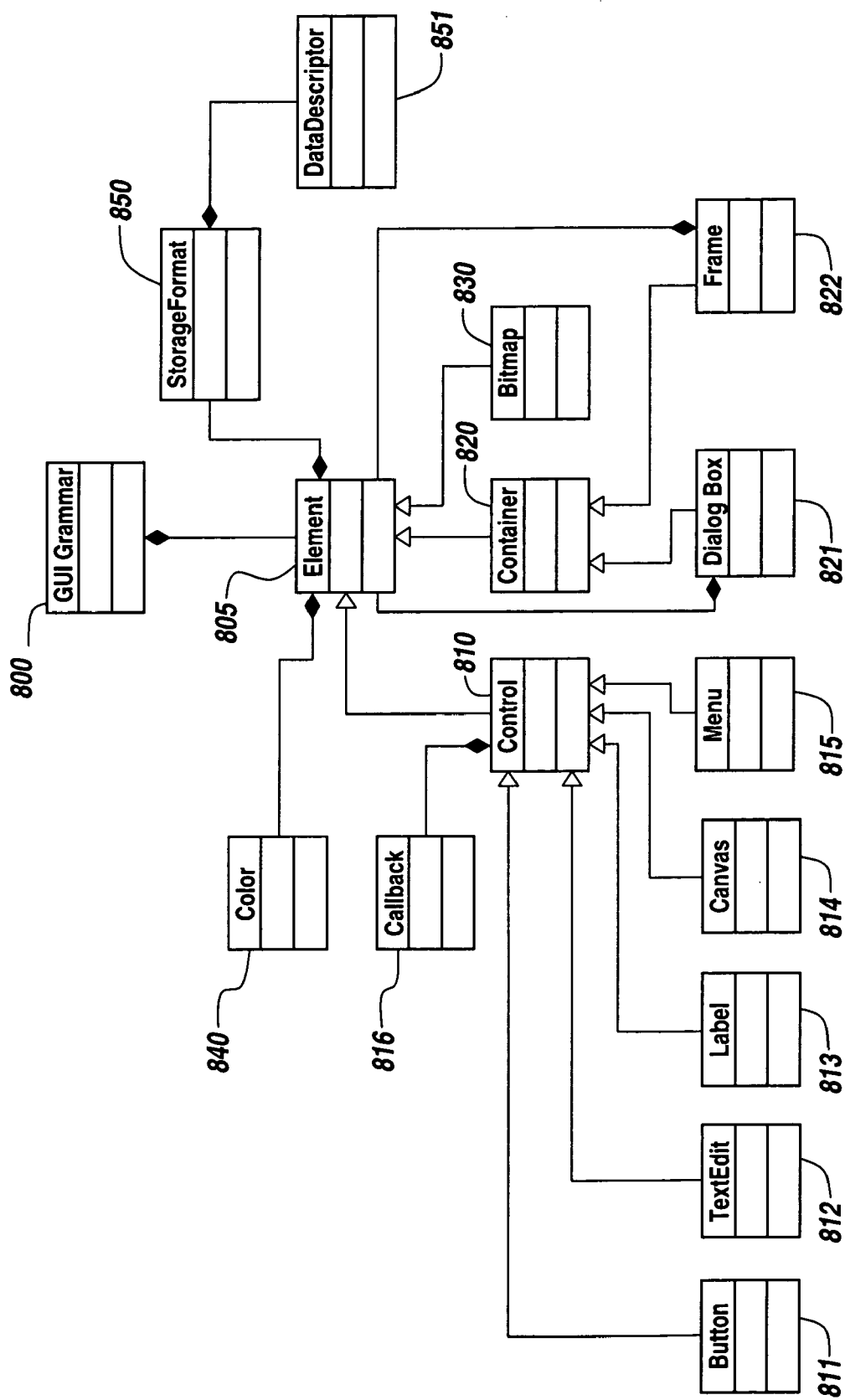
FIG. 8 depicts an exemplary GUI grammar definition.

FIG. 8 depicts an exemplary class relationship diagram for a GUI grammar class 800 employed in an exemplary embodiment. Each GUI schema may be defined by the GUI grammar shown in FIG. 8. In this grammar, an instance of GUI grammar 800 may contain one or more Elements 805. An Element 805 may be an instance of, for example, Control 810, Container 820 or Bitmap 830. Control 810 may be an instance of, for example, Button 811, TextEdit field 812, Label 813, Canvas (drawing area) 814 or Menu 815. In addition, Control 810 may contain Callback 816. Container 820 may be an instance of Frame 821 or Dialog Box 822. Containers recursively contain one or more Elements. Each Element may contain an instance of background Color 840 and StorageFormat 850. StorageFormat 850 may have a list of DataDescriptors 851. From this information, it is possible to construct a parser for this grammar, and the parser can be used to parse the on-disk or in-memory description of the GUI.

Figure 9:
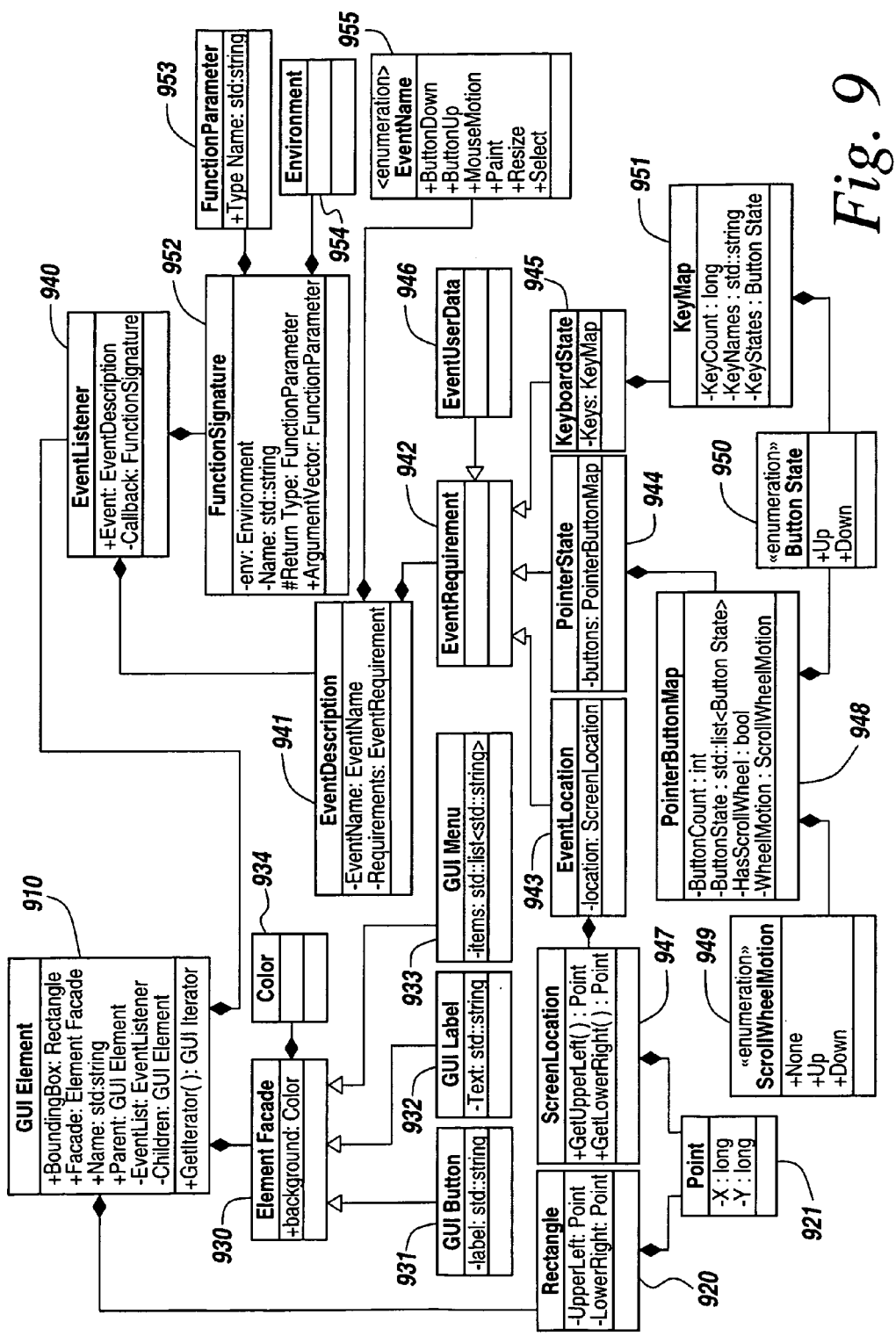
FIG. 9 depicts an exemplary GUI element.

FIG. 9 depicts an exemplary class relationship diagram of GUI element class 910. GUI element class 910 describes an interactive element of a GUI, such as a button, menu or label. A GUI may contain many interactive elements. Instances of GUI Element class 910 may not represent actual and live GUI elements, but rather the data from which such GUI elements can be generated. GUI Element class 910 may provide the properties of BondingBox, Façade, Name, Parent, EventList and Children. The BoundingBox property describes the element's location and may be defined by the instance of Rectangle class 920. The instance of Rectangle class 920 may contain the instance of Point class 921, which indicates X, Y values of upper left and lower right points of a rectangle.

The Facade property describes the element's appearance and may be defined by the instance of Element Façade class 930. The instance of Element Façade class 930 may be the instance of subclasses, such as GUI Button class 931, GUI Label class 932, and GUI Menu class 933. The instance of Element Façade class 930 may contain the instance of Color class 934, which include color information of an element.

The EventList property describes the element's behavior; it may consist of a list of instances of EventListener class 940. EventListener class 940 describes a user initiated event and a callback to be invoked in response to the user event. The instance of EventListener class 940 may contain the instances of EventDescription class 941 and FunctionSignature class 952. EventDescription class 941 describes an event name and event requirements. The instance of EventDescription class 941 may contain multiple instances of EventRequirement class 942 and a single instance of EventName class 955. Each instance of EventRequirement class 942 may be the instance of a subclass, such as EventLocation class 943, PointerState class 944 or KeyboardState 945. The instance of EventLocation class 943 may contain the instance of ScreenLocation class 947, which also may contain one or more instances of Point class 921. The instance of PointerState class 944 may contain an instance of PointerButtonMap class 948, which may contain instances of ScrollWheelMotion class 949 and Button State class 950. An instance of KeyboardState class 945 may contain an instance of KeyMap class, which may contain an instance of Button State class 950.

FunctionSignature class 952 describes callback function name, the return type of the callback function and the argument vector of the callback function. An instance of FunctionSignature class 952 may contain instances of FunctionParameter class 953 and Environment class 954.

FIG. 9 shows only a subset of the possible events and element types, which is illustrative but not exhaustive. The GUI Element 910 class hierarchy as practiced in the invention is capable of representing at least the following GUI elements: menu (drop down, menu bar, context and popup), button (including, but not limited to pushbutton, radio button and toggle button), label (textual or graphical), canvas (drawing area), input fields (single and multiple line text inputs), lists (multi and single selection) and more complex GUI elements such as tree browsers and COM controls. Additionally the GUI Element 910 class hierarchy, as practiced, can represent a wide variety of user events, such as mouse motion, mouse clicks and keyboard input. The subset of GUI elements and events depicted in FIG. 9 was chosen to illustrate the variety of elements and events which can be represented. The GUI Element 910 class can be extended to represent other events and GUI elements in ways that will be obvious to those of ordinary skill in the art.

Figure 10:
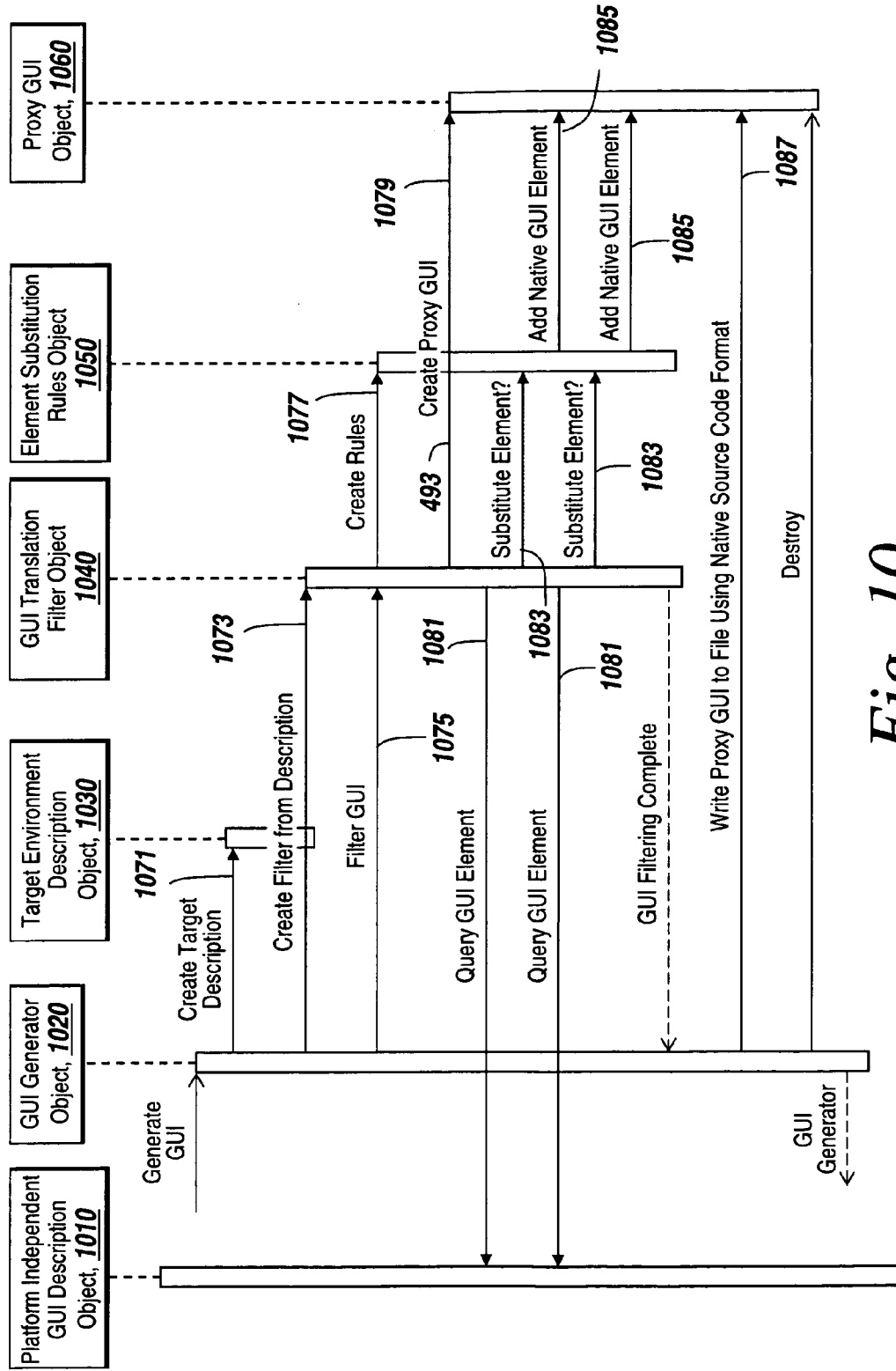
FIG. 10 depicts an exemplary proxy GUI generation procedure.

FIG. 10 depicts an exemplary sequence diagram depicting the proxy GUI generation phase in more detail. GUI generator object 1020 may create target environment description object 1030 (arrow 1071) that describes GUI elements available in the target environment. The GUI generator object 1020 may also create a GUI translation filter object 1040 from target environment description 1030 (arrow 1073). Filter object 1040 loops over all the GUI elements in the platform independent GUI description and generates GUI equivalents native to the target environment.

In FIG. 10, Platform Independent GUI Description Object 1010 may be equivalent to Platform Independent GUI Description Object 570 from FIG. 5, and Platform Independent GUI Description Object 440 from FIG. 4. When receiving a message to filter GUI elements in platform independent description object 1010 (arrow 1075), GUI translation filter object 1040 may create element substitution rules object 1050 (arrow 1077). Element substitution rules object 1050 may be used to resolve the incompatibilities between GUI target environments. Element substitution rules object 1050 may enumerate heuristic rules that determine how to represent the GUI elements of platform independent description object 1010 in the target environment. Element substitution rules object 1050 describes, for example, how to substitute a set of checkboxes for a group of radio boxes.

GUI translation filter object 1040 queries GUI elements in platform independent description object 1010 (arrow 1081) and determines whether the element needs to be substituted (arrow 1083). For example, if platform independent description object 1010 stipulates a set of radio buttons, but the target environment only supports check boxes, the GUI generation may substitute check boxes for the radio buttons and add the check boxes to proxy GUI object 1060 (arrow 1085).

An exemplary algorithm for creating a proxy GUI from a platform independent description may be provided as follows.
    For Each Element at GUI level N
        Filter the element to obtain platform specific equivalent
        Add filtered element to the platform specific description
        If Element is a container
            Recursively iterate through Level N+1
    End Loop After proxy GUI object 1060 is completed, proxy GUI object 1060 may be written to a file in source code format native to the target environment (arrow 1087), for example, a Java file for the Java target environment, a Visual Basic file for Microsoft Excel environment, a JSP page for HTTP embedding, etc. The proxy GUI file may be stored in storage. Additionally, or alternatively, proxy GUI object 1060 may be written to a file in a descriptive format such as XML, and that descriptive format file may be stored in storage. The descriptive file may conform to the target environment GUI schema.

Figure 11:
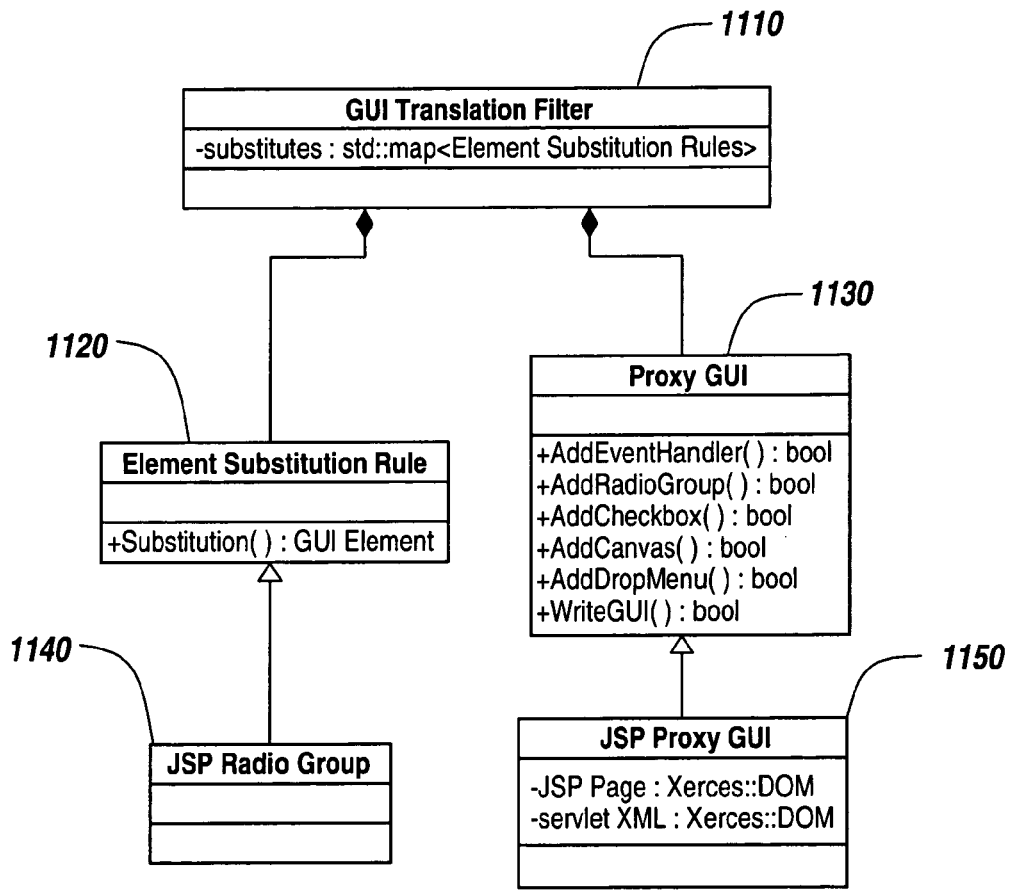
FIG. 11 depicts an exemplary GUI translation filter hierarchy.

FIG. 11 depicts an exemplary GUI translation filter class hierarchy. The class hierarchy may include GUI translation filter class 1110. GUI Translation Filter class 1110 may use many instances of element substitution rule class 1120 and proxy GUI 1130. Instances of the Element Substitution rule class 1120 and Proxy GUI class 1130 are "contained" by instances of the GUI Translation Filter class 1110. Element substitution rule class 1120 may be the parent class of many specific element substitution classes, for example, JSP Radio Group 1140. A subclass of Element substitution rule 1120 may represent a specific process of GUI element substitution. JSP Radio Group 1140, for example, may specify how to create a radio button group in the Java Server Pages target environment. Element substitution rule class 1120 (and each subclass of Element substitution rule 1120) may include an operation, such as Substitution( ) that substitutes GUI elements available in the target environment for the GUI elements specified in the platform independent GUI description. Proxy GUI 1130 may include a plurality of operations for adding the filtered GUI elements to a structured document that represents the desired target GUI.

The Substitution( ) operation may take a GUI element as input and return a GUI element as output. If the returned GUI element is different than the input, substitution has occurred. For example, a MATLAB radio group may consist of a containing frame (with label) and a number of radio buttons. On a JSP page, the radio button group may have a separate label and no containing frame. The JSP radio group substitution rule class 1140 may transform the platform independent Frame-Label-ButtonList GUI Element to a platform independent Label-ButtonList GUI Element. The GUI Filter may send the Label-ButtonList element to the Proxy GUI 1130 via the AddRadioGroup( )method.

This example is an illustrative architecture and there may be many more types of substitution rules, as required by the differences between GUI schemas.

When the structured document is complete, that is, when each of the elements in the platform independent GUI is visited, the exemplary embodiment may traverse the structured document and generate the native code or the target environment description that implements or defines the native GUI.

The Proxy GUI may be stored as a structured document, for example, as one that conforms to the W3C document object model, which allows independent access to each part of the document. In an embodiment, each GUI element added to the document may cause changes in one or more sections of the structured document. Alternatively, some GUI elements added to the document may cause changes in one or more sections of the structured document.

Subclasses of proxy GUI 1130 may exist for each native GUI target, such as JSP proxy GUI 1150, Java proxy GUI, Visual Basic proxy GUI, etc. This diagram illustrates a single subclass for clarity. Each subclass manages the data necessary for storing the native GUI as a structured document and each also implements a WriteGUI( ) method which traverses the structured GUI and produces the appropriate native code.

Figure 12:
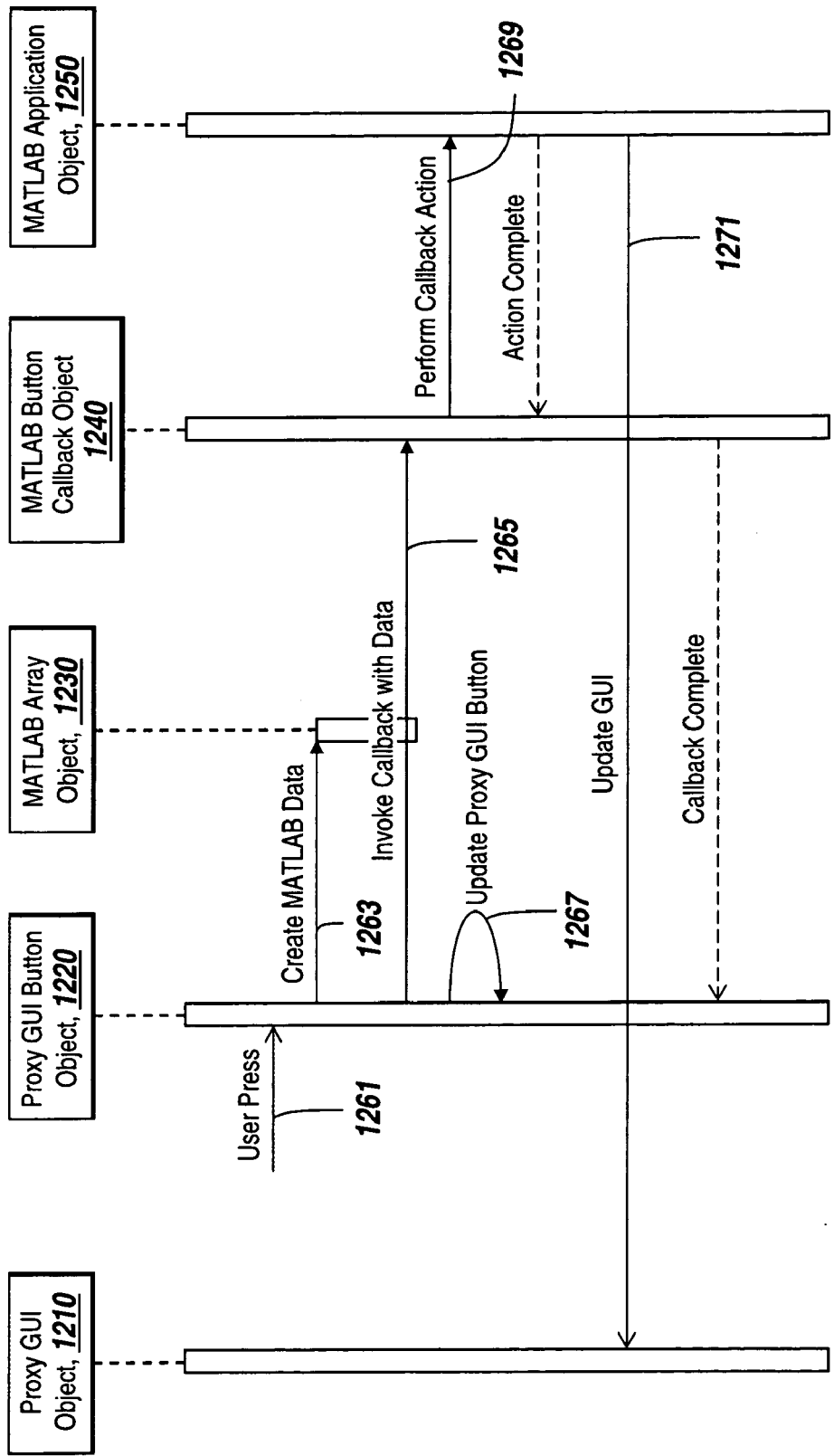
FIG. 12 depicts an exemplary interaction with a proxy GUI.

FIG. 12 depicts an exemplary interaction with a proxy GUI in a target environment. In this figure, the target environment is unspecified, but the original environment is the MATLAB technical computing environment. Thus, the generated proxy GUI in the target environment is interacting with a MATLAB GUI in the original environment. Note that original environment means any environment capable of hosting a native MATLAB GUI, for example the MATLAB desktop application or the MATLAB Component Runtime or the MATLAB Virtual Machine. When a user presses proxy GUI button object 1220 (arrow 1261), proxy GUI object 1210 may generate input data (arrow 1263), such as MATLAB array data object 1230, to invoke a callback function (arrow 1265), such as MATLAB button callback function object 1240, using the input data. The proxy GUI button object 1220 may be updated to reflect the invocation of the callback function (arrow 1267).

Proxy GUI object 1210 may initiate proxy callback functions that invoke callback functions coded in the original MATLAB environment. The GUI elements in the proxy GUI may be linked to the MATLAB callback functions in the original environment so that the callback action may be performed in the original environment (arrow 1269). The changes in the original GUI by the callback action may be reflected in the proxy GUI in the target environment. A certain element of the proxy GUI, such as a canvas, in particular, for drawing images, may be directly available to the MATLAB application, so that the MATLAB application can update the element (arrow 1271). When the MATLAB application starts, there may be an initial exchange of information between the proxy GUI and MATLAB to enable the monitoring and detection process. Proxy GUI object 1210 monitors MATLAB application object 1250 for changes in the original GUI. When such changes are detected, the Proxy GUI may update its user interface control items like buttons, dropdown menus, etc., to reflect the changes in the original GUI.

Figure 13:
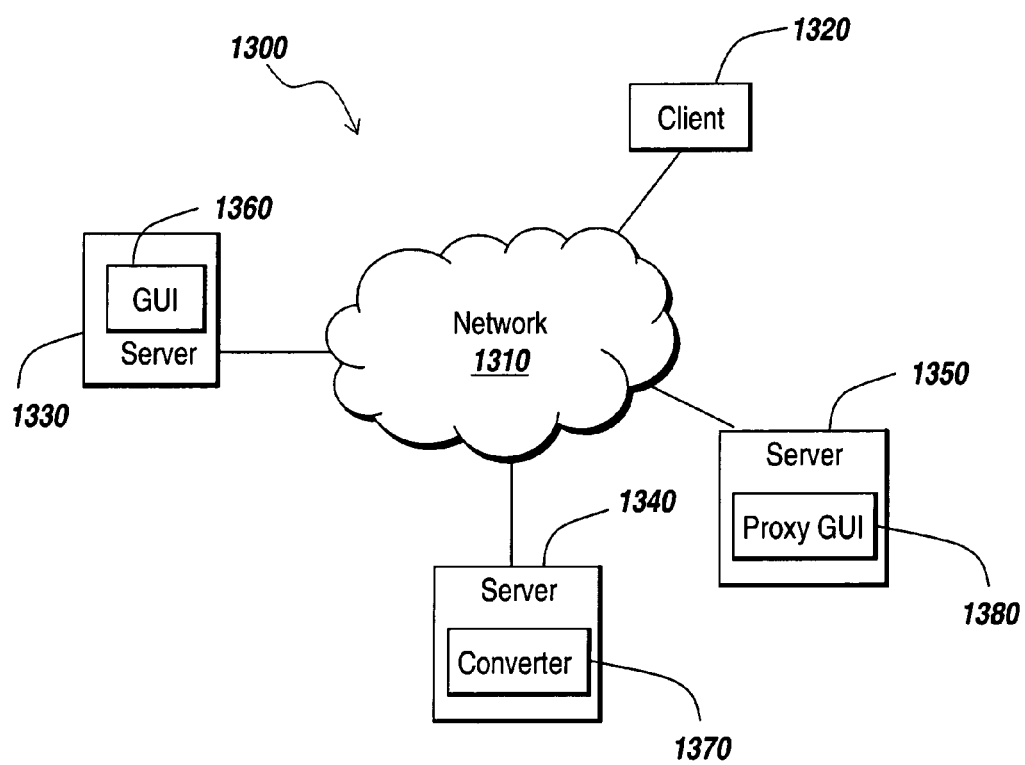
FIG. 13 depicts a network environment suitable for distributed implementations of the exemplary embodiments.

FIG. 13 depicts network environment 1300 suitable for processing distributed implementations of the exemplary embodiments that create a proxy GUI from an original or uses the original GUI application via the proxy GUI. Environment 1300 may include one or more servers 1330, 1340 and 1350 coupled to client 1320 via communication network 1310. When client 1320 is a developer, the developer may access server 1350 to create proxy GUI 1380. The developer may also access server 1340 to convert GUI 1360 to proxy GUI 1380 using GUI converter 1380. When client 1320 is a user, the user may access server 1350 to embed or save the proxy GUI 1380. In an exemplary embodiment, servers 1330, 1370 and 1380 may be provided on the same or different device.

Communication network 1310 may include Internet, intranet, Local Area Network (LAN), Wide Area Network (WAN), Metropolitan Area Network (MAN), wireless network (e.g., using IEEE 802.11, Bluetooth, etc.), etc. Client 1320 and servers 1330, 1340 and 1350 may interface to communication network 1310 through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. Communication network 1310 may use middleware, such as Common Object Request Broker Architecture (CORBA) or Distributed Component Object Model (DCOM) to allow a computer (e.g., client 1320) on communication network 1310 to communicate directly with another computer or device (e.g., server 1330) that is connected to communication network 1310. In addition, communication network 1310 may use Remote Method Invocation (RMI) or Remote Procedure Call (RPC) technology. RMI and RPI are exemplary technologies that allow functions, methods, procedures, etc., to be called over environment 1300. For example, client 1320 may invoke a method that resides remotely on server 1330.

Exemplary embodiments may be provided as one or more computer-readable programs, instructions or code embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus. In general, the computer-readable programs, instructions or code may be implemented in any programming language. Some examples of languages that may be used include Python, C, C++, C#, Java, Javascript etc. Further, the computer readable programs, instructions or code may be implemented in a hardware description language or any other language that allows specifying computation such as, for example, Deoxyribonucleic acid (DNA). The software programs, instructions or code may be stored on or in one or more mediums as object code.

In one implementation, a technical computing environment (TCE) may be implemented in a number of forms, such as a text-based form, a graphically-based form, etc. For example, a TCE may be implemented using one or more text-based products. For example, a text-based a TCE, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Scilab from The French Institution for Research in Computer Science and Control (INRIA); or Modelica or Dymola from Dynasim. The text-based TCE may support one or more commands that support code generation, model analysis and validation constraints generation, constraints checking, etc.

Alternatively, a TCE may be implemented as a graphically-based a TCE using products such as, but not limited to, Simulink®, Stateflow®, SimEvents™, etc., by The MathWorks, Inc.; VisSim by Visual Solutions; LabView® by National Instruments; Dymola by Dynasim; Extend from Imagine That Inc.; SoftWIRE by Measurement Computing; WiT by DALSA Coreco; VEE Pro or SystemVue by Agilent; System VIEW from Elanix, Vision Program Manager from PPT Vision, Khoros from Khoral Research, Gedae by Gedae, Inc.; Scicos from (INRIA); Virtuoso from Cadence, Rational Rose from IBM, Rhopsody or Tau from Telelogic; or aspects of a Unified Modeling Language (UML) or SysML environment. The graphically-based TCE may support code generation, constraints generation, constraints checking, etc.

A TCE may further be implemented as a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor performance of generated code 130, etc.).

In an alternative embodiment, aspects of the invention may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another TCE may be MATLAB-compatible and may be able to use the array command, the array transpose command, or other MATLAB commands.

Exemplary embodiments are described above. It is, however, expressly noted that these exemplary embodiments are not limiting, but rather the intention is that additions and modifications to what is expressly described herein also are included within the scope of the present implementation. Moreover, it is to be understood that the features of the various embodiments described herein are not mutually exclusive and can exist in various combinations and permutations, even if such combinations or permutations are not made express herein, without departing from the spirit and scope of the present implementation.

Since certain changes may be made without departing from the scope of the present implementation, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present implementation and that the illustrations contained herein are singular examples of a multitude of possible depictions of the present implementation.

What is claimed is:

1. A non-transitory computer-readable storage medium for storing instructions that when executed in a computing device cause the computing device to generate a graphical user interface, the medium storing:
    one or more instructions for analyzing an original graphical user interface created in a first software environment;
    one or more instructions for creating a platform independent description of the original graphical user interface based on the analyzing;
    one or more instructions for generating a proxy graphical user interface from the platform independent description of the original graphical user interface, wherein the one or more instructions for generating a proxy graphical user interface comprise:
        one or more instructions for creating a description of the second software environment, and
        one or more instructions for creating a translation filter from the description of the second software environment, the translation filter traversing elements in the platform independent description of the original graphical user interface to determine whether the second software environment supports the elements in the platform independent description of the original graphical user interface; and
    one or more instructions for integrating the proxy graphical user interface into a second software environment that differs from the first software environment.

2. The medium of claim 1, further storing:
    one or more instructions for creating a native schema of the original graphical user interface;
    one or more instructions for creating a parser from the native schema; and
    parsing the original graphical user interface using the parser to identify elements of the original graphical user interface.

3. The medium of claim 2, wherein the one or more instructions for creating a platform independent description of the original graphical user interface comprise:
    one or more instructions for creating a platform independent schema of the original graphical user interface; and
    one or more instructions for creating the platform independent description of the original graphical user interface conforming to the platform independent schema using the elements of the original graphical user interface.

4. The medium of claim 1, wherein the one or more instructions for generating a proxy graphical user interface further comprise:
    one or more instructions for creating substitution rules for substituting elements in the original graphical user interface with specified elements that are supported in the second software environment.

5. The medium of claim 1, wherein the one or more instructions for integrating the proxy graphical user interface comprise:
    one or more instructions for generating callback functions to the first software environment; and
    one or more instructions for connecting callback functions in the second environment to the callback functions in the first software environment.

6. The medium of claim 5, wherein the one or more instructions for integrating the proxy graphical user interface further comprise:
    one or more instructions for receiving a user event from the proxy graphical user interface in the second software environment; and
    one or more instructions for invoking the callback functions in the first environment from the proxy graphical user interface via the callback functions in the second environment.

7. The medium of claim 1, further storing:
    one or more instructions for storing the proxy graphical user interface using code native to the second software environment or a description conforming to a GUI schema native to the second software environment.

8. A system for generating a graphical user interface, the system comprising:
    a processor configured to:
        analyze a graphical user interface from a first software environment to produce a platform independent description of the graphical user interface,
        generate a proxy graphical user interface from the platform independent description of the graphical user interface,
        create a description of the second software environment,
        create a translation filter from the description of the second software environment, the translation filter traversing elements in the platform independent description of the graphical user interface to determine whether the second software environment supports the elements, and integrate the proxy graphical user interface in a second software environment that differs from the first software environment; and a memory configured to:
store the graphical user interface, and
store the proxy graphical user interface generated from the platform independent description, and integrated into the second software environment.

9. The system of claim 8, wherein the processor is further configured to:
create a native schema of the graphical user interface; and
create a parser from the schema for parsing the graphical user interface to identify elements in the graphical user interface.

10. The system of claim 9, wherein the processor is further configured to:
create a platform independent schema of the graphical user interface; and
create the platform independent description conforming to the platform independent schema using the elements of the graphical user interface.

11. The system of claim 8, wherein the processor is further configured to:
create substitution rules for substituting elements in the platform independent description with elements that are supported in the second software environment.

12. The system of claim 8, wherein the processor is further configured to:
generate callback functions to the first software environment; and
connect the callback functions in the first environment to the callback functions in the second software environment.

13. The system of claim 12, wherein the processor is further configured to:
receive a user event from the proxy graphical user interface in the second software environment; and
invoke the callback functions in the first environment from the proxy graphical user interface via the callback functions in the second environment.

14. The system of claim 8, wherein the processor is further configured to:
store the proxy graphical user interface using code native to the second software environment or using a description which conforms to a GUI schema native to the second environment.

15. A non-transitory computer-readable storage medium for storing instructions that when executed in a computing device cause the computing device to share a graphical user interface by a plurality of software environments, the medium storing:
one or more instructions for creating an original graphical user interface in a first software environment;
one or more instructions for exporting the original graphical user interface into a platform independent form;
one or more instructions for importing the platform independent form of the original graphical user interface into a second software environment that differs from the first software environment;
one or more instructions for creating a description of the second software environment;
one or more instructions for creating a translation filter from the description of the second software environment, the translation filter traversing elements in the platform independent form of the original graphical user interface to determine whether the second software environment supports the elements; and
one or more instructions for creating a proxy graphical user interface in the second software environment that corresponds to the original graphical user interface.

16. The medium of claim 15, further storing:
one or more instructions for generating a markup language representation of the original graphical user interface, the markup language representation including descriptions of elements that are in the original graphical user interface.

17. The medium of claim 15, further storing:
one or more instructions for connecting the callback functions in the second software environment to the callback functions in the first environment.

18. A method, implemented in a computing device, for generating a graphical user interface, the method comprising:
analyzing, with the computing device, an original graphical user interface created in a first software environment;
creating, with the computing device, a platform independent description of the original graphical user interface based on the analyzing;
generating, with the computing device, a proxy graphical user interface from the platform independent description of the original graphical user interface, wherein generating the proxy graphical user interface comprises:
creating a description of the second software environment, and
creating a translation filter from the description of the second software environment, the translation filter traversing elements in the platform independent description of the original graphical user interface to determine whether the second software environment supports the elements in the platform independent description of the original graphical user interface; and
integrating, with the computing device, the proxy graphical user interface into a second software environment that differs from the first software environment.

* * * * *